(12) United States Patent
Jones et al.

(10) Patent No.: US 8,333,518 B2
(45) Date of Patent: Dec. 18, 2012

(54) RADIO FREQUENCY IDENTIFICATION (RFID) IN COMMUNICATION CONNECTIONS, INCLUDING FIBER OPTIC COMPONENTS

(75) Inventors: Ashley Wesley Jones, Denton, TX (US); Peter Timothy Travis, Milton, VT (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/418,752

(22) Filed: Mar. 13, 2012

(65) Prior Publication Data

US 2012/0168521 A1 Jul. 5, 2012

Related U.S. Application Data

(63) Continuation of application No. 12/774,898, filed on May 6, 2010, now Pat. No. 8,172,468.

(51) Int. Cl.
*G02B 6/36* (2006.01)
*H04B 10/12* (2006.01)
*G08B 13/14* (2006.01)

(52) U.S. Cl. ............... 385/92; 385/53; 385/99; 385/89; 385/135; 398/141; 340/572.1; 340/10.1; 439/577

(58) Field of Classification Search .................. 385/53, 385/100, 139, 76, 77, 135, 136, 138, 88, 385/89, 94; 340/572.1, 687, 686.1, 686.2, 340/686.3, 10.1; 398/141; 439/577
See application file for complete search history.

(56) References Cited

U.S. PATENT DOCUMENTS

| | | |
|---|---|---|
| 4,889,977 A | 12/1989 | Haydon |
| 5,483,467 A | 1/1996 | Krupka et al. |

(Continued)

FOREIGN PATENT DOCUMENTS

DE 19841738 3/2000

(Continued)

OTHER PUBLICATIONS

Written Open of the International Searching Authority for European Patent application 10788172.4-2210 mailed Jul. 6, 2012, 14 pages.

(Continued)

*Primary Examiner* — Brian Healy
(74) *Attorney, Agent, or Firm* — Joseph M. Homa

(57) ABSTRACT

Radio frequency identification (RFID)-equipped communication components are disclosed. The communication components can include fiber optic components, such as fiber optic connectors and fiber optic adapters as examples. An RFID-equipped circuit is provided in the communication components to communicate information. In order that the electrical circuit be provided in the communication component without altering the communication component connection type, the circuit may be disposed in at least one recessed area of the communication component housing. In this manner, the communication component maintains its connection type such that it is compatible with a complementary communication component connection type for backwards compatibility while also being RFID-equipped. The circuit may also be provided in a substrate containing one or more electrical contacts coupled to the circuit such that a wired coupling is established with one or more electrical contacts provided in another communication component when connected.

18 Claims, 26 Drawing Sheets

U.S. PATENT DOCUMENTS

| | | | |
|---|---|---|---|
| 5,528,222 A | 6/1996 | Moskowitz et al. | |
| 5,821,510 A | 10/1998 | Cohen et al. | |
| 5,910,776 A | 6/1999 | Black | |
| 5,914,862 A | 6/1999 | Ferguson et al. | |
| 5,995,006 A | 11/1999 | Walsh | |
| 6,002,331 A | 12/1999 | Laor | |
| 6,025,725 A | 2/2000 | Gershenfeld et al. | |
| 6,100,804 A | 8/2000 | Brady et al. | |
| 6,118,379 A | 9/2000 | Kodukula et al. | |
| 6,127,929 A | 10/2000 | Roz | |
| 6,133,835 A | 10/2000 | De Leeuw et al. | |
| 6,164,551 A | 12/2000 | Altwasser | |
| 6,232,870 B1 | 5/2001 | Garber et al. | |
| 6,424,263 B1 | 7/2002 | Lee et al. | |
| 6,424,315 B1 | 7/2002 | Glenn et al. | |
| 6,496,113 B2 | 12/2002 | Lee et al. | |
| 6,496,382 B1 | 12/2002 | Ferguson et al. | |
| 6,522,308 B1 | 2/2003 | Mathieu | |
| 6,618,022 B2 | 9/2003 | Harvey | |
| 6,693,513 B2 | 2/2004 | Tuttle | |
| 6,784,802 B1 | 8/2004 | Stanescu | |
| 6,808,116 B1 | 10/2004 | Eslambolchi et al. | |
| 6,829,427 B1 | 12/2004 | Becker | |
| 6,847,586 B1 | 1/2005 | Chen | |
| 6,857,897 B2 | 2/2005 | Conn | |
| 6,897,374 B2 | 5/2005 | Garber et al. | |
| 6,898,368 B2 | 5/2005 | Colombo et al. | |
| 6,899,626 B1 | 5/2005 | Luciano et al. | |
| 6,915,050 B2 | 7/2005 | Koyasu et al. | |
| 6,924,997 B2 | 8/2005 | Chen et al. | |
| 6,968,994 B1 | 11/2005 | Ashwood Smith | |
| 6,971,895 B2 | 12/2005 | Sago et al. | |
| 6,973,243 B2 | 12/2005 | Koyasu et al. | |
| 6,999,028 B2 | 2/2006 | Egbert | |
| 7,014,100 B2 | 3/2006 | Zierolf | |
| 7,061,366 B2 | 6/2006 | Bell et al. | |
| 7,068,912 B1 | 6/2006 | Becker | |
| 7,069,345 B2 | 6/2006 | Shteyn | |
| 7,080,945 B2 | 7/2006 | Colombo et al. | |
| 7,081,808 B2 | 7/2006 | Colombo et al. | |
| 7,102,520 B2 | 9/2006 | Liu et al. | |
| 7,151,455 B2 | 12/2006 | Lindsay et al. | |
| 7,158,031 B2 | 1/2007 | Tuttle | |
| 7,158,033 B2 | 1/2007 | Forster | |
| 7,165,728 B2 | 1/2007 | Durrant et al. | |
| 7,170,393 B2 | 1/2007 | Martin | |
| 7,194,180 B2 | 3/2007 | Becker | |
| 7,205,898 B2 | 4/2007 | Dixon et al. | |
| 7,209,042 B2 | 4/2007 | Martin et al. | |
| 7,210,858 B2 | 5/2007 | Sago et al | |
| 7,221,277 B2 | 5/2007 | Caron et al. | |
| 7,224,278 B2 | 5/2007 | Phaneuf et al. | |
| 7,224,280 B2 | 5/2007 | Ferguson et al. | |
| 7,226,217 B1 | 6/2007 | Benton et al. | |
| 7,233,250 B2 | 6/2007 | Forster | |
| 7,243,837 B2 | 7/2007 | Durrant et al. | |
| 7,249,705 B2 | 7/2007 | Dudley | |
| 7,253,735 B2 | 8/2007 | Gengel et al. | |
| 7,265,674 B2 | 9/2007 | Tuttle | |
| 7,275,970 B2 | 10/2007 | Hoshina | |
| 7,297,028 B2 | 11/2007 | Daikuhara et al. | |
| 7,298,266 B2 | 11/2007 | Forster | |
| 7,298,330 B2 | 11/2007 | Forster | |
| 7,306,489 B2 | 12/2007 | Werthman et al. | |
| 7,336,883 B2 | 2/2008 | Scholtz | |
| 7,348,884 B2 | 3/2008 | Higham | |
| 7,349,605 B2 | 3/2008 | Noonan et al. | |
| 7,352,285 B2 | 4/2008 | Sakama et al. | |
| 7,352,289 B1 | 4/2008 | Harris | |
| 7,356,208 B2 | 4/2008 | Becker | |
| 7,374,101 B2* | 5/2008 | Kaneko | 235/492 |
| 7,554,448 B2 | 6/2009 | Tomioka | |
| 8,172,468 B2* | 5/2012 | Jones et al. | 385/92 |
| 2002/0092347 A1 | 7/2002 | Niekerk et al. | |
| 2003/0021580 A1 | 1/2003 | Matthews | |
| 2003/0061393 A1 | 3/2003 | Steegmans et al. | |
| 2003/0179073 A1 | 9/2003 | Ghazarian | |
| 2004/0041714 A1 | 3/2004 | Forster | |
| 2004/0114879 A1 | 6/2004 | Hiereth et al. | |
| 2004/0117515 A1 | 6/2004 | Sago et al. | |
| 2004/0149736 A1 | 8/2004 | Clothier | |
| 2004/0253874 A1 | 12/2004 | Plishner | |
| 2005/0052287 A1 | 3/2005 | Whitesmith et al. | |
| 2005/0068179 A1 | 3/2005 | Roesner | |
| 2005/0076982 A1 | 4/2005 | Metcalf et al. | |
| 2005/0093677 A1 | 5/2005 | Forster et al. | |
| 2005/0150962 A1* | 7/2005 | Colombo et al. | 235/492 |
| 2005/0215119 A1 | 9/2005 | Kaneko | |
| 2005/0224585 A1 | 10/2005 | Durrant et al. | |
| 2005/0232636 A1 | 10/2005 | Durrant et al. | |
| 2005/0242950 A1 | 11/2005 | Lindsay et al. | |
| 2005/0259930 A1 | 11/2005 | Elkins et al. | |
| 2005/0285718 A1 | 12/2005 | Enguent | |
| 2006/0006999 A1 | 1/2006 | Walczyk et al. | |
| 2006/0015233 A1 | 1/2006 | Olsen, III et al. | |
| 2006/0019540 A1 | 1/2006 | Werthman et al. | |
| 2006/0044148 A1 | 3/2006 | Daniels et al. | |
| 2006/0139149 A1 | 6/2006 | Faro et al. | |
| 2006/0145863 A1 | 7/2006 | Martin et al. | |
| 2006/0148279 A1* | 7/2006 | German et al. | 439/49 |
| 2006/0166546 A1 | 7/2006 | Ashizawa et al. | |
| 2006/0232419 A1 | 10/2006 | Tomioka et al. | |
| 2006/0233506 A1 | 10/2006 | Noonan et al. | |
| 2006/0267737 A1 | 11/2006 | Colby | |
| 2006/0267778 A1 | 11/2006 | Gengel et al. | |
| 2007/0018787 A1 | 1/2007 | Martinez de Velasco Cortina et al. | |
| 2007/0023525 A1 | 2/2007 | Son et al. | |
| 2007/0053644 A1* | 3/2007 | Scholtz | 385/134 |
| 2007/0057771 A1 | 3/2007 | Tomioka | |
| 2007/0120684 A1 | 5/2007 | Utaka et al. | |
| 2007/0152828 A1 | 7/2007 | Mohalik | |
| 2007/0205897 A1 | 9/2007 | Forster | |
| 2007/0205902 A1 | 9/2007 | Cote et al. | |
| 2007/0216534 A1 | 9/2007 | Ferguson et al. | |
| 2007/0236355 A1 | 10/2007 | Flaster et al. | |
| 2007/0247284 A1 | 10/2007 | Martin et al. | |
| 2007/0273507 A1 | 11/2007 | Burchell et al. | |
| 2008/0030353 A1 | 2/2008 | O'Toole et al. | |
| 2008/0048826 A1 | 2/2008 | Agrawal et al. | |
| 2008/0100456 A1 | 5/2008 | Downie et al. | |
| 2008/0159738 A1* | 7/2008 | Lavranchuk | 398/17 |
| 2008/0240724 A1 | 10/2008 | Aguren | |
| 2011/0274437 A1* | 11/2011 | Jones et al. | 398/141 |
| 2012/0088412 A1* | 4/2012 | Mattson et al. | 439/660 |

FOREIGN PATENT DOCUMENTS

| | | |
|---|---|---|
| DE | 10249414 A1 | 5/2004 |
| EP | 1455550 A2 | 9/2004 |
| GB | 2371211 A | 7/2002 |
| JP | 03242795 | 10/1991 |
| JP | 2003148653 | 10/1991 |
| JP | 2002264617 | 9/2002 |
| JP | 2003172827 | 6/2003 |
| JP | 2003229215 | 8/2003 |
| JP | 2004039389 | 2/2004 |
| JP | 2004142500 | 5/2004 |
| JP | 2004152543 | 5/2004 |
| JP | 2004245963 | 9/2004 |
| JP | 2004247090 | 9/2004 |
| JP | 2004264901 | 9/2004 |
| JP | 2004265624 | 9/2004 |
| JP | 2004317737 | 11/2004 |
| JP | 2004349184 | 12/2004 |
| JP | 2005018175 | 1/2005 |
| JP | 2005033857 | 2/2005 |
| JP | 2005050581 | 2/2005 |
| JP | 2005084162 | 3/2005 |
| JP | 2005086901 | 3/2005 |
| JP | 2005087135 | 4/2005 |
| JP | 2005092107 | 4/2005 |
| JP | 2005134125 | 5/2005 |
| JP | 2005216698 | 8/2005 |
| JP | 2005302403 | 10/2005 |
| JP | 2005315980 | 11/2005 |
| JP | 2005339983 | 12/2005 |
| JP | 2006054118 | 2/2006 |

| | | |
|---|---|---|
| JP | 2006245983 | 9/2006 |
| JP | 2006279650 | 10/2006 |
| JP | 2007087849 | 4/2007 |
| JP | 2007088957 | 4/2007 |
| JP | 2007158993 | 6/2007 |
| JP | 2007189774 | 7/2007 |
| JP | 2007221400 | 8/2007 |
| WO | 03098175 A1 | 11/2003 |
| WO | 2004030154 A2 | 4/2004 |
| WO | 2005069203 A2 | 7/2005 |
| WO | 2006058119 A1 | 6/2006 |
| WO | 2008000656 A1 | 1/2008 |
| WO | 2009091888 A1 | 7/2009 |

OTHER PUBLICATIONS

International Search Report for PCT/US2010/057605 mailed Feb. 17, 2011, 2 pages.

\* cited by examiner

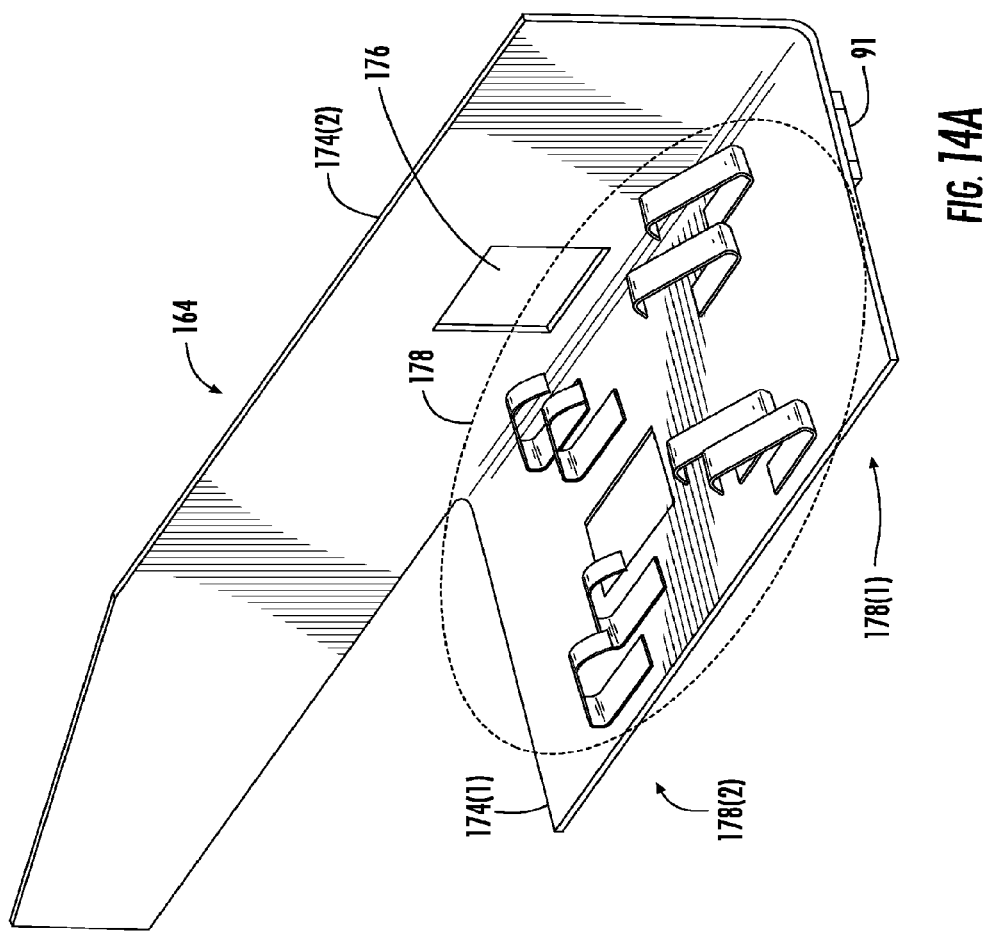

RADIO FREQUENCY IDENTIFICATION (RFID) IN COMMUNICATION CONNECTIONS, INCLUDING FIBER OPTIC COMPONENTS

RELATED APPLICATIONS

This application is a continuation application of and claims priority to U.S. patent application Ser. No. 12/774,898 now U.S. Pat. No. 8,172,468, entitled "Radio Frequency Identification (RFID) In Communication Connections, Including Fiber Optic Components," filed on May 6, 2010 which is incorporated herein by reference in its entirety.

This application is related to U.S. patent application Ser. No. 11/590,505 now U.S. Pat. No. 7,782,202, entitled "Radio Frequency Identification of Component Connections," and U.S. patent application Ser. No. 11/590,513 now U.S. Pat. No. 7,772,975, entitled "System for Mapping Connections Using RFID Function," both of which were filed on Oct. 31, 2006 and are hereby incorporated herein by reference in their entireties.

BACKGROUND

1. Field of the Disclosure

The technology of the present application is related to use of radio frequency (RF) communications in communication connections, such as fiber optic components and fiber optic component connections, as examples.

2. Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fibers are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections. The fiber optic equipment is customized based on the application need, and is typically included in housings that are mounted in equipment racks to maximize space.

Because of the skill required in making optical fiber connections, pre-connectorized fiber optic cables are provided. A fiber optic cable carrying one or more optical fibers can be connectorized with a fiber optic connector by the fiber optic cable manufacturer before the fiber optic cable is deployed. As a result, splicing of optical fibers in the field can be avoided. Such pre-connectorized fiber optic cables can be provided in the form of patch cables, jumper cables, and break out cables to facilitate optical connections between fiber optic equipment. These cables are often relatively short and have one or more fiber optic connectors at each end. In use, each fiber optic connector will be placed within a port located in a piece of fiber optic equipment, patch panel, another connector, etc. However, as fiber optic equipment and networks become more complex, the identification of proper plugs and sockets (into which the plugs are mated) for setting up and maintaining the systems accordingly becomes more complex. Therefore, indicia such as labels, hang tags, markings, coloration, and striping have been used to help identify specific fibers, cables, plugs, and/or sockets. While such indicia have been helpful in providing information to the craftsman setting up or servicing a system, large numbers of cables and connections are still complex to manage.

In response, radio frequency identification (RFID) systems have been applied to fiber optic systems to provide information regarding fibers, plugs, and sockets. These RFID systems can employ RFID transponders comprising an antenna and an RFID integrated circuit (IC) chip attached to plugs and sockets for use in identification. The RFID IC chip stores information for radio frequency (RF) communication. An RFID reader comprising a transceiver sends an RF signal to interrogate information from the RFID transponders. The RFID reader can determine stored information about the cable, plug, and/or socket from the RFID transponders.

In some fiber optic connector systems, an RFID transceiver antenna is located near the socket for detecting an RFID transponder attached to the inserted plug, and the transceiver antenna is connected to the remainder of the transceiver via wiring. Thus, the operation is dependent upon the relative proximity to a targeted item. This can lead to either difficult or inaccurate results, as signals may be received and/or communicated by unintended RFID transponders on items near the targeted item. That is, the reader in the system would identify nearby RFID transponders, or would identify pairs of transponders close together (for example, on a plug and on a socket holding the plug), all within the read range of the reader. Further, if a plug were only partially inserted into a socket so as not to make a functional connection with the optical fiber(s), the RFID antennas in the plug and/or socket might inaccurately indicate that the connection was made due to the proximity between the plug and the socket.

Moreover, when dealing with an entire panel of connectorized cables and sockets, it may not be practical or even possible to rely upon proximity, either plug-to-socket or reader-to-transponder, as a method of querying a targeted RFID transponder. In fact, the RFID transponders across the entire panel could respond to an RFID reader interrogation in certain situations, thereby providing no useful information as to identification of individual plugs and/or sockets of interest. In such situations, a craftsman may need to separate a plug from the socket and panel to obtain information from the RFID transponder of the plug or socket, thereby breaking the fiber optic connection in the process. Such action adds a step to the process of identification in terms of unplugging or at least re-orienting objects in a certain way to avoid "false" readings from the panel due to proximity issues. Also, it may be necessary to disconnect the optical fiber plugs, possibly one after another, until a targeted optical fiber is found. Such serial disconnection can be even more undesirable when equipment is operating and disconnections cause problems for the users of the systems. In such cases, the whole system may have to be shut down just to allow for the identification of a single cable, even if sophisticated RFID equipment is in place. The process becomes more complex when extended to entire networks including multiple equipment housings, cables, etc., perhaps spread throughout a building.

It can also be difficult for the craftsman in the field to determine how or why a plug, cable, socket, or the like has failed or otherwise needs replacing. Again, identification of a single item within a group can be difficult, as well as identifying conditions leading to a particular issue. Conditions causing the problem could be transitory and no longer apparent or in effect when the craftsman arrives for service. Accordingly, providing more information to the craftsman for purposes of identification, troubleshooting, service, warranty, etc. would also be useful.

Therefore, a need exists for an RFID system that provides simple, reliable, and/or unobtrusive identification of one or more components and mapping of networks of components, including identification of location and past and/or present condition.

SUMMARY OF THE DETAILED DESCRIPTION

Embodiments disclosed in the detailed description include communication components that are radio frequency identification (RFID)-equipped to wirelessly communicate information regarding the communication component. This information may include an identification of the communication component. In certain embodiments disclosed herein, the communication components are fiber optic components. A transponder or other RFID circuit (also referred to as "RFID tag") is provided in the fiber optic component for communicating wirelessly to an RFID reader or other transceiver. In this manner, the fiber optic component can be interrogated by an RFID reader that receives information concerning the fiber optic component to assist in mapping or other tracking of the fiber optic component and its connection to another fiber optic component. Detection of the physical connection of components can be accomplished via the electrical connection of circuits located on each component. In order that the electrical circuit be provided as part of the fiber optic component without altering the fiber optic component connection type, the electrical circuit can be disposed in at least one recessed area of the fiber optic component housing such that the geometry of the fiber optic component housing is maintained. In this manner, the fiber optic component maintains its connection type such that it is compatible with a complementary fiber optic component connection type for backwards compatibility while also being RFID-equipped.

The electrical circuit may be provided in a substrate. The substrate may include printed circuit board (PCB) or other circuit substrate disposed in the at least one recessed area of the fiber optic component. The PCB may be rigid or semi-rigid. The circuit substrate may be provided as a flexible circuit substrate which may assist in the circuit substrate conforming with the geometry of the fiber optic component in which the circuit substrate is disposed. An antenna can be coupled to the electrical circuit to receive RF signals which are routed by the electrical circuit to the transponder or other RFID IC chip. One or more electrical contacts may be provided in the PCB and coupled to the electrical circuit and the transponder or RFID circuit. In this manner, communication can also be exchanged via wired communication with the transponder or RFID circuit. To establish wired communications regarding connections between RFID-equipped fiber optic components, the electrical contacts can be attached to the fiber optic components such that electrical contacts between the fiber optic components couple to each other to automatically couple their electrical circuits when connected. This coupling establishes a communication between the transponder or RFID circuit and the fiber optic components wherein identifications can be exchanged, such as identification information. Such identifications can then be communicated wirelessly to an RFID reader or other transceiver to track or map fiber optic component connections.

The antenna or antenna components in the fiber optic components may also be arranged such that an antenna in one fiber optic component is disposed in a non-parallel plane to an antenna in another connected fiber optic component when an electrical coupling between the fiber optic components is established. In this manner, the antenna components can be separated. Separation of the antenna components may reduce or eliminate overlap between radiation patterns of the antennas to enhance reception. The antenna components may also be arranged on the fiber optic components to allow technicians to easily insert or remove fiber optic components when panel-mounted in a dense array.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operation of the invention.

BRIEF DESCRIPTION OF THE FIGURES

FIG. 14A is a top perspective view of an exemplary flexible electronic circuit with circuit layout according to FIG. 15 and configured to be integrated into the duplex LC fiber optic adapter in FIG. 3 to provide an RFID-equipped duplex LC fiber optic adapter;

DETAILED DESCRIPTION

Figure 1:
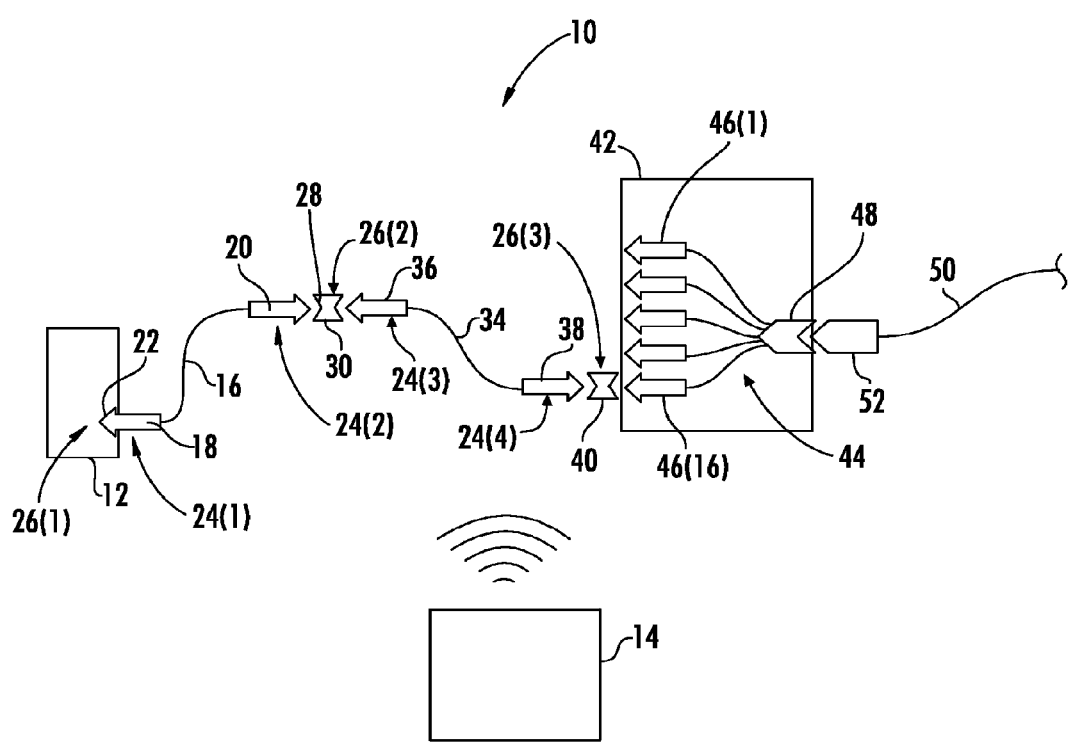
FIG. 1 is a schematic diagram of an exemplary fiber optic connection mapping system utilizing radio frequency identification (RFID)-based communications.

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include communication components that are radio frequency identification (RFID)-equipped to wirelessly communicate information regarding the communication component. This information may include an identification of the communication component. In certain embodiments disclosed herein, the communication components are fiber optic components. A transponder or other RFID circuit is provided in the fiber optic component for communicating wirelessly to an RFID reader or other transceiver. In this manner, the fiber optic component can be interrogated by an RFID reader that receives information concerning the fiber optic component to assist in mapping or other tracking of the fiber optic component and its connection to another fiber optic component. Detection of the physical connection of fiber optic components can be accomplished via the electrical connection of circuits located on each component. In order that the electrical circuit be provided as part of the fiber optic component without altering the fiber optic component connection type, the electrical circuit can be disposed in at least one recessed area of the fiber optic component housing such that the geometry of the fiber optic component housing is maintained. In this manner, the fiber optic component maintains its connection type such that it is compatible with a complementary fiber optic component connection type for backwards compatibility while also being RFID-equipped.

The electrical circuit may be provided in a substrate. The substrate may include printed circuit board (PCB) or other circuit substrate disposed in the at least one recessed area of the fiber optic component. The PCB may be rigid or semi-rigid. The circuit substrate may be provided as a flexible circuit substrate. which may assist in the circuit substrate conforming with the geometry of the fiber optic component in which the circuit substrate is disposed. An antenna can be coupled to the electrical circuit to receive RF signals which are routed by the electrical circuit to the transponder or other RFID IC chip. One or more electrical contacts may be provided and coupled to the electrical circuit and the transponder or RFID circuit. In this manner, communication can also be exchanged via wired communication with the transponder or RFID circuit. To establish wired communications regarding connections between RFID-equipped fiber optic components, the electrical contacts can be attached to the fiber optic components such that electrical contacts between the fiber optic components couple to each other to automatically couple their electrical circuits when connected. This coupling establishes a communication between the transponder or RFID circuit and the fiber optic components wherein identifications can be exchanged, such as identification information. Such identifications can then be communicated wirelessly to an RFID reader or other transceiver to track or map fiber optic component connections.

Figure 2:
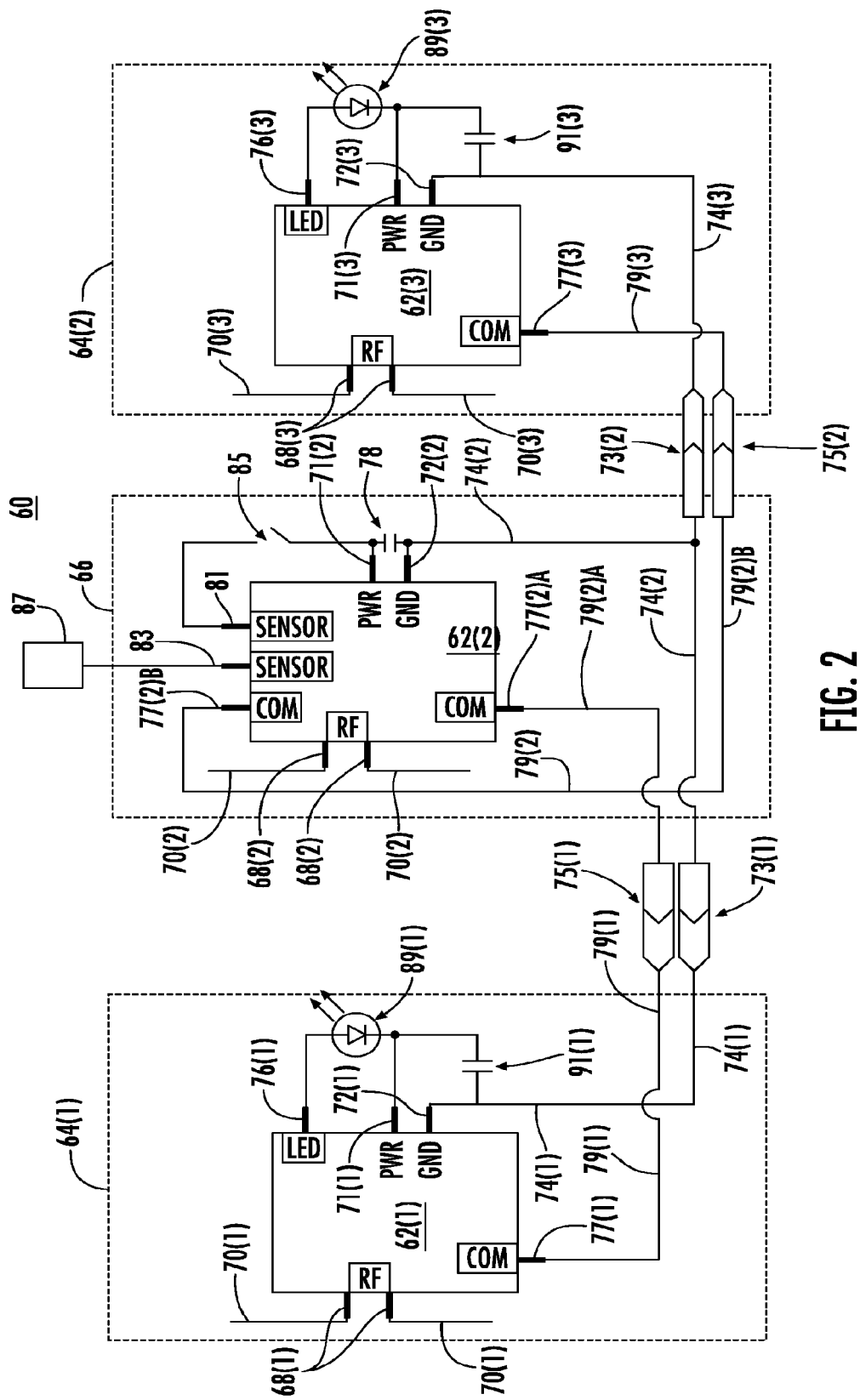
FIG. 2 is a schematic diagram of an exemplary RFID circuit for coupling RFID IC chips between RFID-equipped fiber optic connectors and an RFID-equipped fiber optic adapter when connected.
Figure 3:
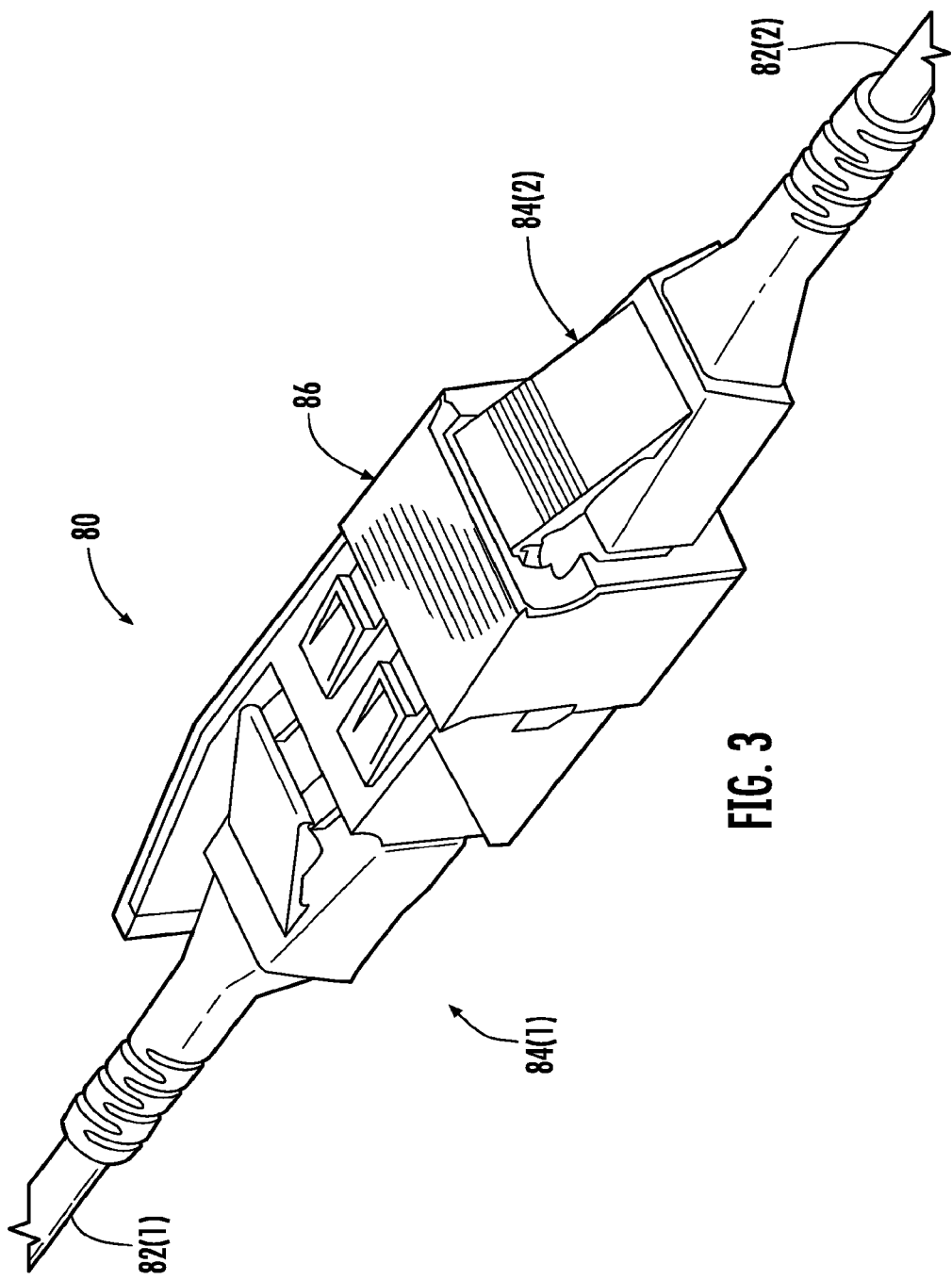
FIG. 3 illustrates a top perspective view of an exemplary fiber optic connection arrangement between two RFID-equipped duplex LC fiber optic connectors through an intermediary RFID-equipped duplex LC fiber optic adapter.

Before discussing the particular aspects of the exemplary RFID-equipped communication components provided in the form of fiber optic components starting at FIG. 3, a description of an exemplary RFID system is discussed with respect to FIGS. 1 and 2. As illustrated in FIG. 1, an RFID system 10 for interrogating communication components and their interconnections, including but not limited to fiber optic connectors and fiber optic adapters, is provided. Note that although the RFID system 10 in FIG. 1 discloses fiber optic components, the RFID system 10 in FIG. 1 can be employed with any type of communication components and is not limited to fiber optic components. In this embodiment, the RFID system 10 allows mapping of fiber optic cable connections utilizing RFID functions. Mapping includes mapping of the physical location of communication components and/or mapping of the connectivity of the fiber optic components. Referring again to FIG. 1, as schematically illustrated, the RFID system 10 includes a housing 12, an RFID reader 14, and a fiber optic cable 16. The RFID reader 14 may be a fixed or handheld reader, as examples. A fiber optic cable 16 is provided that includes fiber optic connectors 18, 20 on each end. For simplicity of illustration, the housing 12 is shown to include one fiber optic adapter 22 that receives the fiber optic connector 18 from one end of the fiber optic cable 16. However, the housing 12 may have a plurality of fiber optic adapters for receiving a plurality of fiber optic connectors. The housing 12 may comprise any element along a fiber optic cable network, such as a router, server, any connected device, wireless device, patch panel, adapter, or even another connector, etc. Therefore, any device to which a fiber optic cable may be attached could comprise the housing 12.

Using the fiber optic connectors 18, 20 as an example, each fiber optic connector 18, 20 has an associated RFID transponder 24(1), 24(2). The RFID transponder 24(1), 24(2) may be a passive, semi-passive, or active transponder and may be designed to respond and/or communicate at the frequency desired. As will be further described in more detail below, the RFID transponders 24(1), 24(2) may be entirely or partially located on the fiber optic connectors 18, 20 and may be provided in an integrated circuit (IC). The fiber optic adapter 22 may also include an RFID transponder 26(1) for receiving signals from a condition responsive device and transmitting signals related to the detected condition. Therefore, upon receipt of the fiber optic connector 18 into the fiber optic adapter 22, a change in condition is registered via one or more of the structures or functions as will be described below. A polling of the RFID transponders 24(1), 24(2), 26(1) by the RFID reader 14 before and after such insertion, or via sending contact closure instructions and re-polling, can identify which fiber optic connector and/or adapter has been connected. Information within the inserted fiber optic connector, in this case the fiber optic connector 18, will also identify that fiber optic connector 20 is or should be at the opposite end of fiber optic cable 16. This information may be made available to the technician, for example, for connecting the fiber optic connector 20 to a particular fiber optic adapter, for connectorizing the cable, etc. The housing 12 may have another fiber optic adapter (not shown) for receiving another fiber optic connector (not shown), and the process may continue further.

This mapping functionality may be extended to other fiber optic components and connections. For example, the fiber optic connector 20 having the RFID transponder 24(2) may further be received by a fiber optic adapter 28 in another housing 30, which may be a patch panel or an adapter. The fiber optic adapter 28 may also have an associated RFID transponder 26(2). Again, a condition responsive device may detect insertion of the fiber optic connector 20 into the fiber optic adapter 28, which can be reported from the RFID transponders 24(2), 26(2) in various ways to the RFID reader 14, as will be described in greater detail below. At some point, a last leg of a pre-connectorized fiber optic cable 34 can be provided which is connected via a fiber optic connector 36 to a fiber optic adapter 40. The fiber optic connector 36 includes an RFID transponder 24(3) to communicate a detection of a connection with the fiber optic adapter 28 to the RFID reader 14. The fiber optic adapter 28 may also have an RFID transponder 26(2) in the same regard. A fiber optic connector 38 on the opposite end of the fiber optic cable 34 may also have a transponder 24(4) and may connect with the fiber optic adapter 40 of a fiber optic module 42. The fiber optic adapter 40 may also have an associated RFID transponder 26(3). By providing this connection of fiber optic connectors and adapters, identification and other information, including connection information, regarding the fiber optic connectors 18, 20, 36, 38 and/or fiber optic adapters 22, 28, 40 can be interrogated by the RFID reader 14.

The information communicated as a result of connecting RFID-equipped fiber optic connectors to RFID-equipped fiber optic adapters can be flexibly managed in various ways, as desired. For example, the fiber optic adapter 28 may be considered a single adapter for connecting two fiber optic connectors 20, 36, if desired. Also, internal cabling (not shown) could connect the fiber optic adapter 28, for example, as on the inside of a patch panel housing or the like. The internal cabling could include RFID functionality, for example, by connecting to the fiber optic connectors 20, 36 directly or via adapters having a structure for detecting or communicating change of condition, as described above. Alternatively, a database could hold information regarding which adapters are internally connected within a patch panel by correlating the unique identifications of the respective adapters, and RFID functionality could be employed with the fiber optic connectors and adapters only.

Cables having different types and numbers of connectors at each end can employ RFID functionality as well. For example, as illustrated in FIG. 1, the fiber optic module 42 may comprise a break-out 44 for twelve individual optical fibers. The break-out 44 may also be referred to as a fiber optic fanout assembly 44. Fiber optic connectors 46(1)-46(16) (not all shown) each terminate one of the optical fibers in the breakout 44, whereas a fiber optic connector 48 is a multi-fiber connector, such as an MTP connector for example. The fiber optic connector 38 is connected to the fiber optic connector 46(16), either directly or via an adapter, such as to fiber optic adapter 40. Fiber optic cable 50 is another twelve-fiber cable having a multi-fiber connector 52. Each of the fiber optic connectors and adapters may include RFID transponders, as discussed above, that are associated with condition responsive devices for detecting a condition such as insertion. Also, the RFID transponder on each fiber optic connector on a cable may be provided at the manufacturing plant and/or in the field with information regarding the other connector or connectors attached to that cable. In addition or alternatively, the RFID transponders may be able to communicate with one another to identify one another and store in memory (preferably in the integrated circuit chip) the identity of the other RFID transponder for subsequent communication with an RFID reader, for example, by transferring N bits of data. Other information that can be communicated between RFID transponders includes, but is not limited to, status of the connection, manufacturing information, diagnostic information, and event history information.

Therefore, plugging in one end of a fiber optic cable provides some information via the RFID transponder as to the other end of the fiber optic cable and/or optical fiber. It should be understood that any number of fibers could be employed within a fiber optic cable, and any number of break-outs from the multi-fiber cable could be employed. Also, a multi-fiber cable with multi-fiber connectors at each end could be employed.

FIG. 2 illustrates an exemplary RFID circuit 60 in which RFID functionality can be achieved or altered when an RFID-equipped fiber optic connector is inserted into an RFID-equipped fiber optic adapter. In such fashion, the electrical connections and configurations also function as a condition responsive device, akin to those discussed above, in which the insertion of a plug into a socket creates the electrical connection that affects RFID functionality. In this regard, the RFID circuit 60 includes three RFID integrated circuit (IC) chips 62(1), 62(2), 62(3), one RFID IC chip 62(1), 62(3) for two fiber optic connectors 64(1), 64(2), respectively, and one RFID IC chip 62(2) for a fiber optic adapter 66. The RFID IC chips 62(1)-62(3) are coupled together when optical connections are made between the fiber optic connectors 64(1), 64(2) and the fiber optic adapter 66. The RFID IC chips 62(1)-62(3) can be attached or integrated into a respective fiber optic connector or adapter. The RFID IC chips 62(1)-62(3) are RFID enabled, meaning they contain a transponder or other communication device and an antenna interface adapted to be coupled to antennas to communicate wirelessly using RF communications. The RFID IC chip and/or transponder may be provided of any type. As will be discussed by example later in this application, the fiber optic connectors 64(1), 64(2) and the fiber optic adapter 66 are designed such that when a connection is established between them, the RFID IC chips 62(1)-62(3) are coupled to each other to allow information exchange. For example, the RFID IC chips 62(1)-62(3) can exchange unique identifiers associated with their fiber optic connectors and/or adapters to indicate optical connections. The RFID IC chips 62(1)-62(3) may communicate information stored in memory, such as serial number, type of connector, cable type, manufacturer, manufacturing date, installation date, location, lot number, performance parameters (such as optical attenuation measured during installation), identification of what is at other end of the cable, etc. Such information could be preloaded on the RFID IC chips 62(1)-62(3) at the time of manufacture or upon installation via the RFID reader 14. Furthermore, the RFID reader 14, and any associated database and/or processing element, of certain embodiments of the present invention includes stored information relating to one or more RFID transponders and/or components in order to facilitate identification, mapping, or other processing of the information received from one or more RFID transponders. More specifically, the RFID reader 14 includes information that correlates a unique identification number of an RFID transponder to a particular plug and/or socket, to a particular component (such as a fiber optic cable assembly with one or more connectors), to other portions of the component (such as correlating a first connector of a fiber optic cable to a second connector, or grouping multiple adapters of a patch panel, etc.), to past and/or current mating components, and any other parameter, connection, association, or other information that a technician may want know or record when working with and/or monitoring the one or more components. This information can then be interrogated by an RFID reader, such as the RFID reader 14 in the RFID system 10 of FIG. 1 as an example, to provide connectivity information and related mapping.

In this embodiment, each RFID IC chip 62(1)-62(3) contains RF inputs in the form of RF input pins 68(1)-68(3) configured to couple to an antenna or antenna matrices 70(1)-70(3). An antenna coupled to the RFID IC chips 62(1)-62(3) via the antenna matrices 70(1)-70(3) receives RF communication signals from an RFID reader and provides the signals into a transponder via the RF input pins 68(1)-68(3) embedded into the RFID IC chips 62(1)-62(3). Note that the RF input pins 68(1)-68(3) can also support a monopole antenna, or any other type of antenna. An antenna coupled to the antenna matrices 70(1)-70(3) may be configured to operate at any frequency desired, including 2.4 GHz and 900 MHz, as examples.

With continuing reference to FIG. 2, the RFID IC chips 62(1)-62(3) can be designed to be coupled in a daisy-chain fashion. Ground is coupled together for each RFID IC chip 62(1)-62(3) when a connection is established by coupling ground pins 72(1)-72(3) of the RFID IC chips 62(1)-62(3) together via ground lines 74(1)-74(3). The ground lines 74(1)-74(3) are coupled together via electrical contacts 73(1), 73(2) when coupled to each other. One or more capacitors 78 may be coupled between PWR (via power pins 71(1)-71(3)) and GND to store energy received from an interrogation signal over antennas 70(1)-70(3) when the RFID IC chips 62(1)-62(3) are interrogated. This allows the passive RFID IC chips 62(1)-62(3) to operate when not being interrogated. Also as illustrated in FIG. 2, the RFID IC chips 62(1)-62(3) are configured to communicate with each other over serial bus communication lines 79(1), 79(2)A, 79(2)B, 79(3) when coupled to each other via electrical contacts 75(1), 75(2). Each RFID IC chip 62(1)-62(3) contains at least one communication pin 77(1), 77(2)A, 77(2)B, 77(3). Each communication pin 77(1)-77(3) allows serial communications to and from the RFID IC chips 62(1)-62(3). Additional RFID IC chips 62, RFID-enabled or not, can be connected together in a daisy-chain fashion and communicatively coupled to each other if desired.

In this embodiment, the RFID IC chip 62(2) also contains a sense function that activates the RFID IC chip 62(1) in response to an activation of sense pins 81, 83. Although not illustrated in FIG. 2, the sense pins 81, 83 may also be provided on RFID IC chips 62(1) and 62(3). The sense pins 81, 83 may be activated in response to detecting at least one condition. In this embodiment, this includes activation of a switch 85 which may be provided as part of the fiber optic adapter 66. When the switch 85 is activated, a circuit is completed to the sense pin 81, which in turn causes the RFID IC chip 62(2) to communicate with the RFID IC chips 62(1), 62(3). The activation of the switch 85 can be actuated by a hand-operated activation button, which may be spring loaded, but other activation structures such as slides, contact sensors, and the like are also provided in further embodiments. In alternative embodiments, the switch 85 can be activated when the fiber optic adapter 66 is connected with a fiber optic connector 64(1) and/or 64(2). Thus, when activated, the RFID IC chip 62(2) can provide information regarding the condition detected and may also provide other information, such as identification information. A technician could identify a given component by having the RFID reader 14 (FIG. 1) interrogate a panel full of RFID-enabled fiber optic connectors 64(1), 64(2) or the fiber optic adapter 66, then pressing the button for the switch 85 on the given fiber optic connector 64(1), 64(2) or the fiber optic adapter 66, and monitoring the output from the RFID reader 14 to look for which component indicates a certain condition and/or change in condition. This could be accomplished, if desired, without otherwise manipulating, plugging, or unplugging the fiber optic connectors 64(1), 64(2) or the fiber optic adapter 66, thus preventing undesirable disconnection of services (albeit temporary) to one or more customers.

Also in this embodiment, a sensor 87 is coupled to the other sense pin 83 as part of the fiber optic adapter 66. The sensor 87 is configured to provide sensor data to the RFID IC chip 62(2) via the sense pin 83, which in turn causes the RFID IC chip 62(2) to communicate with the other RFID IC chips 62(1), 62(3), if connected. Activating the RFID IC chips 62(1)-62(3) also allows information to be provided to the RFID reader 14 in response to interrogation. However, note that if the RFID IC chips 62(1)-62(3) are connected together, an electrical connection between the RFID IC chips 62(1)-62(3) is still made and information between the RFID IC chips 62(1)-62(3) can be exchanged. In response to a condition change or activation, the RFID reader 14 may also communicate to cause a light source 89(1), 89(3), such as a light emitting diode (LED) or other light source coupled to an LED pin 76(1), 76(3), to light up to indicate to the technician which fiber optic connector 64(1), 64(3) to connect to the fiber optic adapter 66. Other examples of light sources that may comprise the light source 89(1), 89(3) include a liquid crystal display (LCD) and an electroluminescent display. The light source 89(1), 89(3) may be powered by energy from an interrogation signal transmitted by the RFID reader 14. A capacitor bank 91(1), 91(3) may also be provided in the fiber optic connectors 64(1), 64(2) to be charged during interrogation by the RFID reader 14 and to provide reserve power to the light source 89(1), 89(3) when not being interrogated by the RFID reader 14 or when energy from the RFID reader 14 is sporadic or otherwise not strong enough to power the fiber optic connectors 64(1), 64(2).

In order to provide RFID-equipped fiber optic connectors and adapters, the fiber optic connectors and adapters must be physically equipped with RFID components, such as those illustrated in FIG. 2 as an example. Further, to provide electrical connectivity between fiber optic connectors and adapters, the fiber optic connectors and adapters must be equipped with mechanical and other features necessary to establish electrical connections when connections are made. In the RFID circuit 60 of FIG. 2, this means establishing connections between the various IC pins between the RFID IC chips 62(1)-62(3) when the fiber optic connectors and adapters are connected together.

In this regard, FIG. 3 illustrates an example of an RFID-equipped fiber optic connector and adapter arrangement 80. The RFID-equipped fiber optic connector and adapter arrangement 80 provides a duplex LC-type optical connection arrangement for duplex LC fiber optic cables 82(1), 82(2). The RFID-equipped fiber optic connector and adapter arrangement 80 is comprised of two duplex LC fiber optic connectors 84(1), 84(2) connected to a duplex LC fiber optic adapter 86. As will be discussed in more detail below, the duplex LC fiber optic connectors 84(1), 84(2) and the duplex LC fiber optic adapter 86 each include the RFID IC chips 62(1)-62(3) illustrated in FIG. 2 and the antennas 70(1)-70(3) for RF communications to a transponder embedded in the RFID IC chips 62(1)-62(3). The duplex LC fiber optic connectors 84(1), 84(2) and the duplex LC fiber optic adapter 86 include certain components and features that provide an electrical connection between the RFID IC chips 62(1)-62(3) when the duplex LC fiber optic connectors 84(1), 84(2) are connected to the duplex LC fiber optic adapter 86. In this manner, not only are the duplex LC fiber optic connectors 84(1), 84(2) and the duplex LC fiber optic adapter 86 RFID-equipped to provide information about their connector or support fiber optic cable, or adapter, as the case may be, to an RFID reader, but the duplex LC fiber optic connectors 84(1), 84(2) and the duplex LC fiber optic adapter 86 can also communicate information to each other when a connection between them is established as previously discussed. For example, the duplex LC fiber optic connector 84(1) may communicate a unique identification (ID) to the duplex LC fiber optic adapter 86 when a connection is established. This allows an RFID reader, by interrogating the fiber optic connector and/or adapter 84(1), 86, to be aware of the physical connection for any number of reasons, including connection mapping, etc., as previously discussed.

When providing either RFID-equipped fiber optic connectors or adapters, an arrangement to provide electrical connection between the two when connected, or both as disclosed herein, may be desirable to maintain backwards compatibility of the connection type. For example, if RFID components, such as an RFID IC chip 62, and/or electrical or mechanical components for establishing communication upon a connection, are provided for the duplex LC fiber optic connectors 84(1), 84(2) and the duplex LC fiber optic adapter 86, these components may interfere with a standard LC connection type. Thus, in this instance, the duplex LC fiber optic connectors 84(1), 84(2) and/or adapters 86 equipped with additional RFID and communication components may not be able to connect with other LC type fiber optic connectors and/or adapters. However, the duplex LC fiber optic connectors 84(1), 84(2) and/or adapters 86 may still need to be connected to other standard LC fiber optic connectors and/or adapters for establishing optical connections. Thus, even though the disclosure herein is not so limited, the fiber optic cable connector and adapter arrangement 80 in FIG. 3 as well as others disclosed herein provide RFID and other communication components to provide RFID-equipped connectors and adapters that do not interfere or alter standard connection types provided.

Figure 4A:
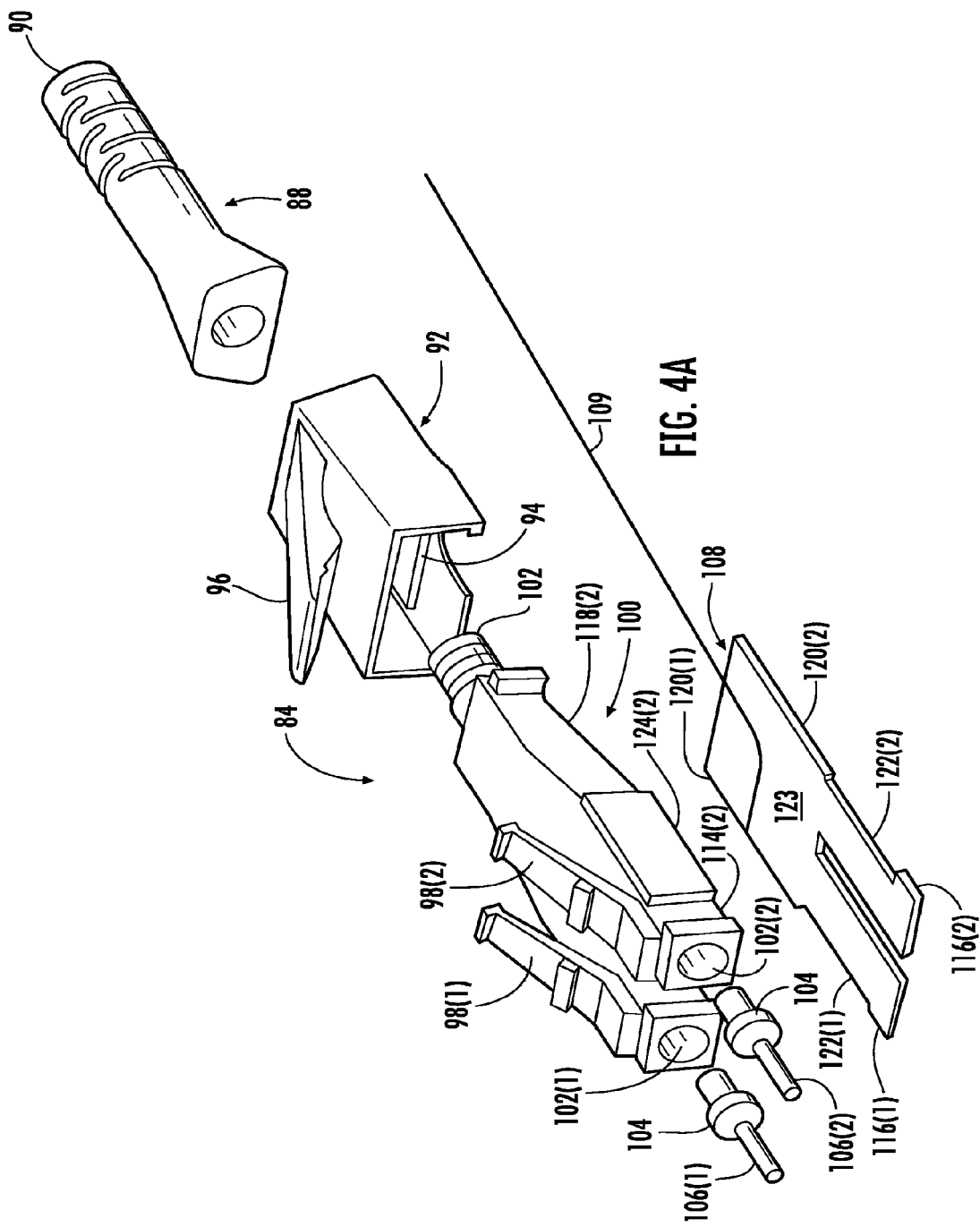
FIG. 4A illustrates a top perspective exploded view of the RFID-equipped duplex LC fiber optic connector illustrated in FIG. 3.
Figure 4B:
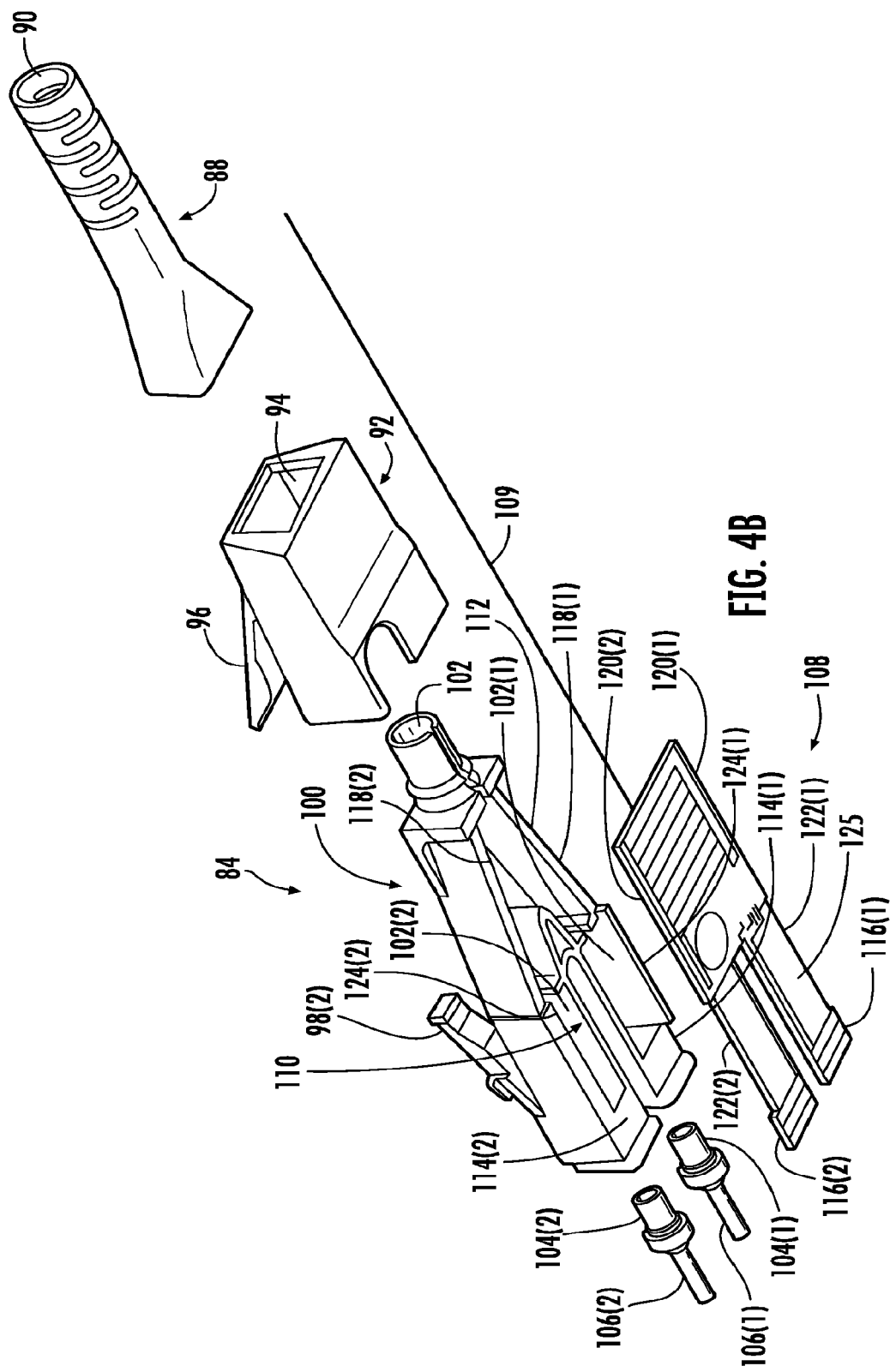
FIG. 4B illustrates a bottom perspective exploded view of the RFID-equipped duplex LC fiber optic connector illustrated in FIG. 3.

In this regard, FIGS. 4A and 4B illustrate top and bottom perspective exploded views, respectively, of the duplex LC fiber optic connector 84 illustrated in FIG. 3. The various components of the duplex LC fiber optic connector 84 are illustrated and will be described in more detail in FIGS. 5-8. As illustrated in FIGS. 4A and 4B, the duplex LC fiber optic connector 84 is comprised of a boot 88 that receives a fiber optic cable through a boot passage 90 disposed within the boot 88. A trigger housing 92 is connected to the boot 88 and configured to receive a fiber optic cable extending through the boot passage 90 through a trigger housing passage 94. The trigger housing 92 contains a trigger or latch 96 configured to engage two duplex LC connector latches 98(1), 98(2) on a duplex LC connector housing 100 to release the duplex LC connector housing 100 from a fiber optic adapter (not shown). As shown in FIG. 4B, the duplex LC connector housing 100 contains a housing passage 102 wherein optical fibers from a fiber optic cable (not shown) inserted therein are divided into two housing passages 102(1), 102(2) to be connected to respective ferrule holders 104(1), 104(2) and ferrules 106(1), 106(2) held by the ferrule holders 104(1), 104(2) and retained in the duplex LC connector housing 100.

FIGS. 4A and 4B also illustrate a substrate in the form of a printed circuit board (PCB) 108 that contains the RFID IC chip 62 and related circuitry provided in FIG. 2 for providing RFID communication functionality for the duplex LC fiber optic connector 84. The PCB 108 in this embodiment is a thin semi-rigid PCB, but may also be completely rigid or flexible. Providing a semi-rigid or flexible PCB as the PCB 108 may be used for structural rigidity when the PCB 108 is disposed in the duplex LC fiber optic connector 84. An antenna wire 109 coupled to the antenna matrix 70 provided in the PCB 108 extends from the PCB 108. The antenna matrix 70 (FIG. 2) is for signal frequency tuning purposes, and the antenna wire 109 is for receiving an RF signal. The antenna wire 109 will extend from the PCB 108 inside the housing passage 102, the trigger housing passage 94, and the boot passage 90, depending on the length of the antenna wire 109, when the duplex LC fiber optic connector 84 is fully assembled. In one embodiment, the antenna matrix 70 and the antenna wire 109 form a monopole antenna, but could be any type of antenna, including but not limited to a dipole or multi-pole antenna, loop antenna, and slot antenna, as examples.

So that the PCB 108 can be provided as part of the duplex LC fiber optic connector 84 without affecting or altering the connector type and to provide backwards compatibility between the duplex LC fiber optic connector 84 and LC fiber optic adapters, the PCB 108 is installed in a recessed area 110 on the bottom side 112 of the duplex LC connector housing 100. The recessed area 110 defines a certain geometry, as illustrated. In this regard, the duplex LC connector housing 100 contains forward recesses 114(1), 114(2) on each side of the duplex LC connector housing 100. The forward recesses 114(1), 114(2) are configured to receive protrusions 116(1), 116(2) in the PCB 108 arranged in a complementary geometry to the geometry of the recessed area 110 in this embodiment. Similarly, the duplex LC connector housing 100 also contains rear recesses 118(1), 118(2) on each side of the duplex LC connector housing 100. The rear recesses 118(1), 118(2) are configured to receive complementary protrusions 120(1), 120(2) in the PCB 108. The PCB 108 also contains recesses 122(1), 122(2) that are configured to be received by protrusions 124(1), 124(2) in the duplex LC connector housing 100. In this regard, a first or top side 123 of the PCB 108 is installed on the bottom side 112 of the duplex LC connector housing 100 such that the footprint of the duplex LC fiber optic connector 84 is not altered from a standard duplex LC fiber optic connector. A second or bottom side 125 of the PCB 108 is exposed as illustrated in FIG. 4B. In this manner, the overall geometry of the duplex LC connector housing 100 is not altered. Thus, the duplex LC fiber optic connector 84 will be backwards compatible with duplex LC fiber optic adapters. The geometry of the recessed area 110 may be any geometry desired as long as the PCB 108 is compatible with such geometry to be retained therein without altering the duplex LC connector housing 100.

Figure 5:
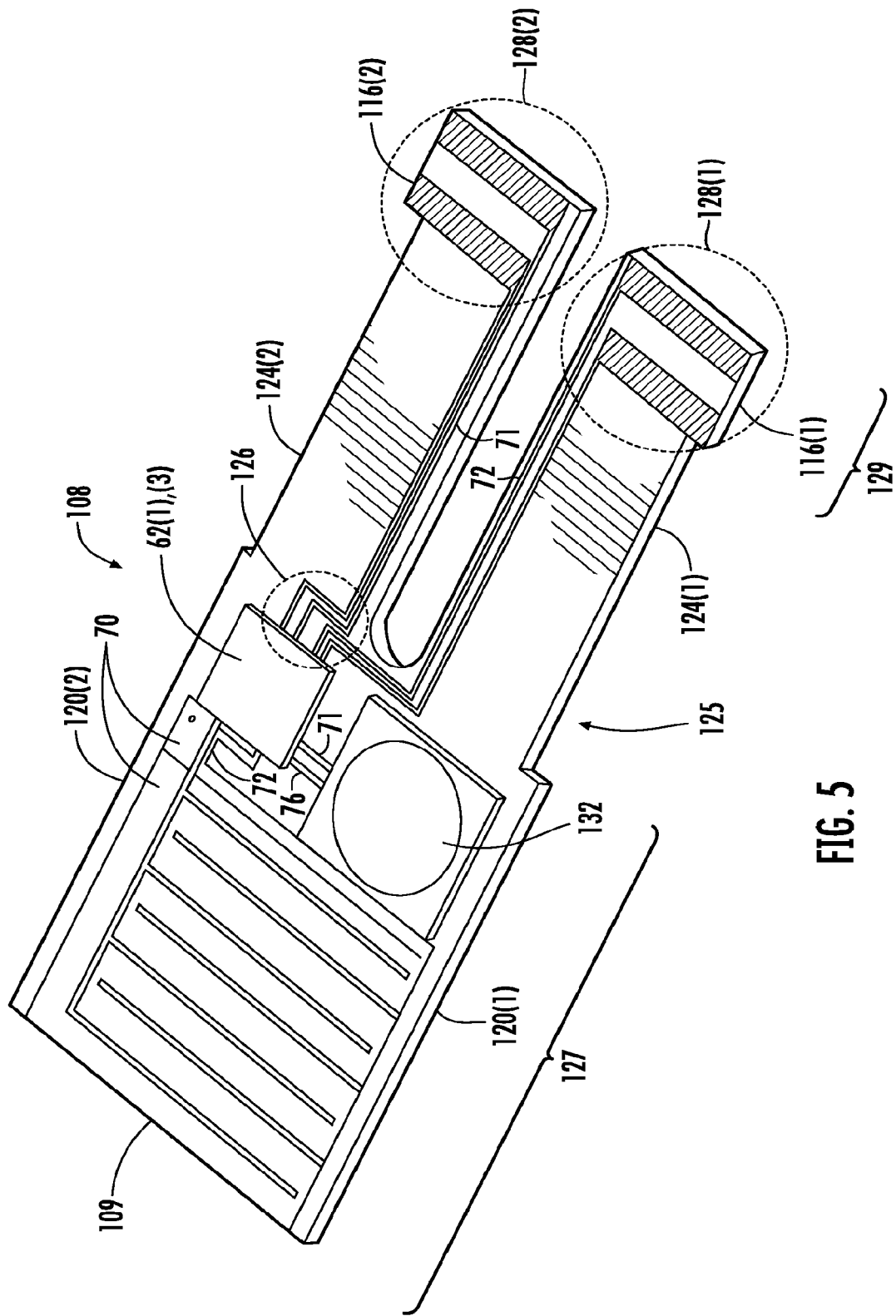
FIG. 5 is a schematic diagram of an exemplary printed circuit board (PCB) configured to be attached to the RFID-equipped duplex LC fiber optic connector in FIG. 3 to provide an integrated RFID circuit.

FIG. 5 illustrates the PCB 108 for the duplex LC fiber optic connector 84 in more detail. The PCB 108 establishes the circuit for the fiber optic connectors 64(1), 64(2) illustrated in the RFID circuit 60 of FIG. 2. The PCB 108 contains the RFID IC chips 62(1), 62(3) in a rear portion 127 of the PCB 108. Traces 126 provided in a forward portion 129 of the PCB 108 to connect pins of the RFID IC chips 62(1), 62(3) to electrical contacts 128(1), 128(2) contained on the PCB 108. These electrical contacts 128(1), 128(2) are electrically conductive leads (e.g., copper, gold) that establish an electrical connection to the RFID IC chips 62(1), 62(3) when the duplex LC fiber optic connector 84 is connected to the compatible duplex LC fiber optic adapter 86, as illustrated in FIG. 3. The traces 126 are labeled according to the RFID circuit 60 in FIG. 2. The RFID IC chips 62(1), 62(3) are also coupled to the antenna matrix 70 provided in the PCB 108, which is coupled to the antenna wire 109 extending out from the PCB 108. The antenna matrix 70 provides a wire loop antenna integrated into the PCB 108 to provide RF signal frequency tuning for signals received on the antenna wire 109. An activation button 132 is also provided to provide the switch 85 in FIG. 2 that enables the RFID IC chip 62 to provide information regarding the switch condition detected and may also provide other information, such as identification information relating to the transponder embedded in the RFID IC chip 62 and/or other RFID transponders. As will be discussed in more detail later in this application, the electrical contacts 128(1), 128(2) are designed to interface with electrical contacts provided in the duplex LC fiber optic adapter 86 to establish an electrical circuit between RFID IC chips 62 in both like that illustrated in FIG. 2.

Figure 6:
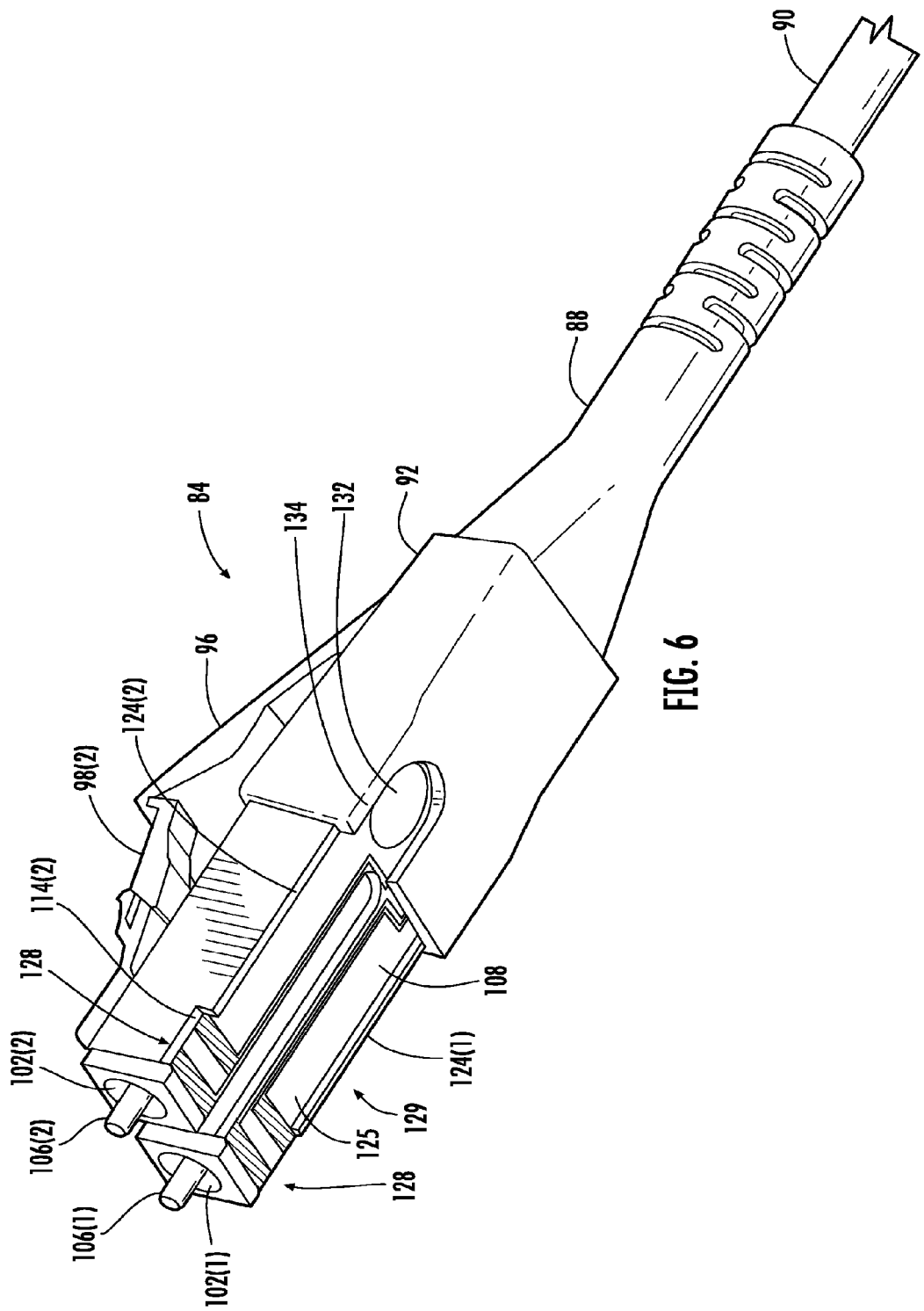
FIG. 6 illustrates a bottom perspective view of the RFID-equipped duplex LC fiber optic connector in FIG. 3.

To secure the PCB 108 to the duplex LC connector housing 100, the trigger housing 92 is slipped over the duplex LC connector housing 100 after the PCB 108 is installed in the recessed area 110 of the duplex LC connector housing 100. This is illustrated in FIG. 6. As illustrated therein, the trigger housing 92 fits over the rear portion 127 (FIG. 5) of the PCB 108. An activation button recess 134 is provided in the trigger housing 92 to allow access to the activation button 132 on the PCB 108. The forward portion 129 of the PCB 108 is set into the recessed area 110, but is exposed. An adhesive is placed in the edges of the recesses 114, 118 of the duplex LC connector housing 100 during assembly, before the PCB 108 is installed in the recessed area 110. The adhesive bonds the forward portion 129 of the PCB 108 to the duplex LC connector housing 100. The adhesive may be any type of adhesive or epoxy.

Figure 7:
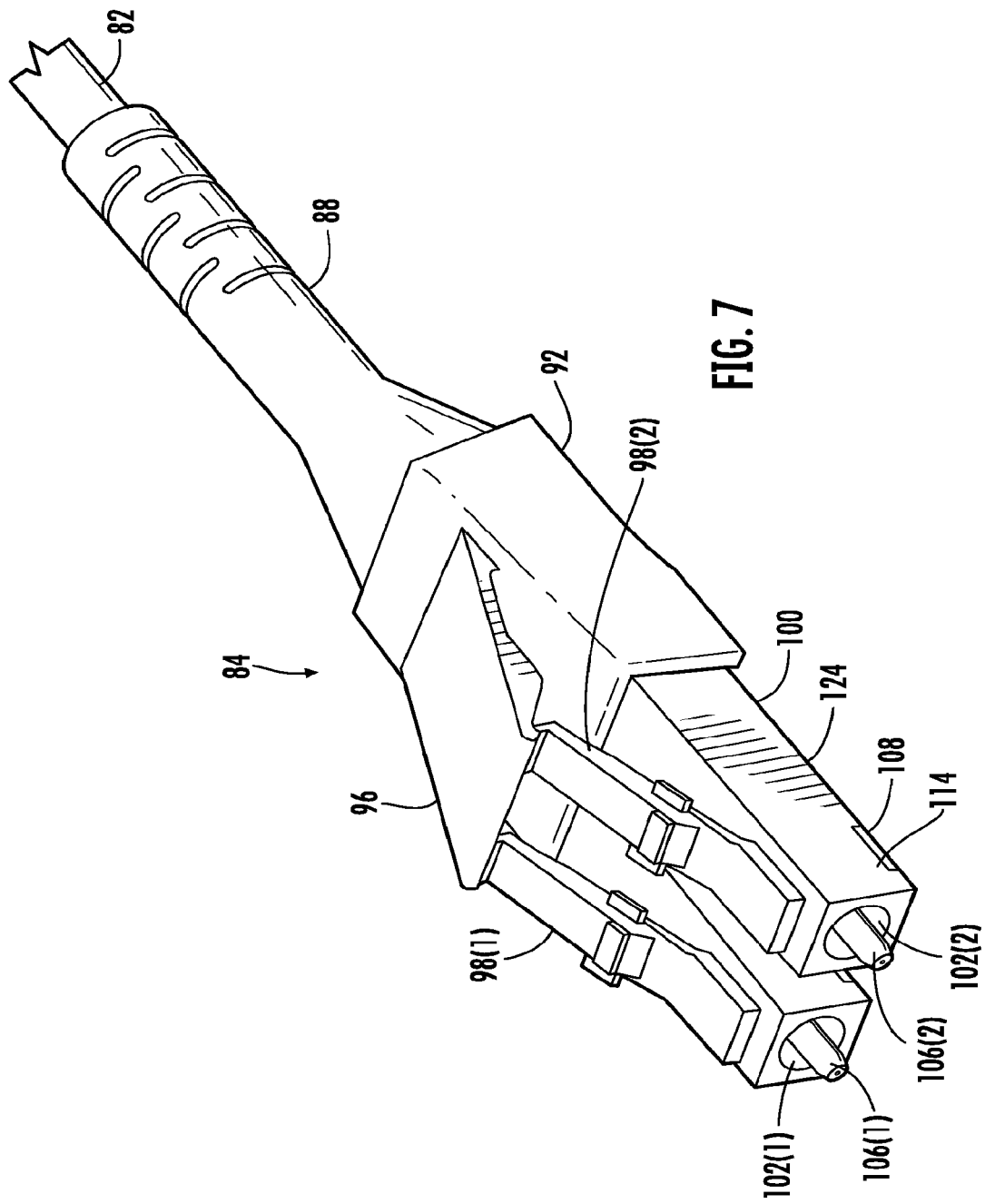
FIG. 7 illustrates a top perspective view of the RFID-equipped duplex LC fiber optic connector in FIG. 3.
Figure 8:
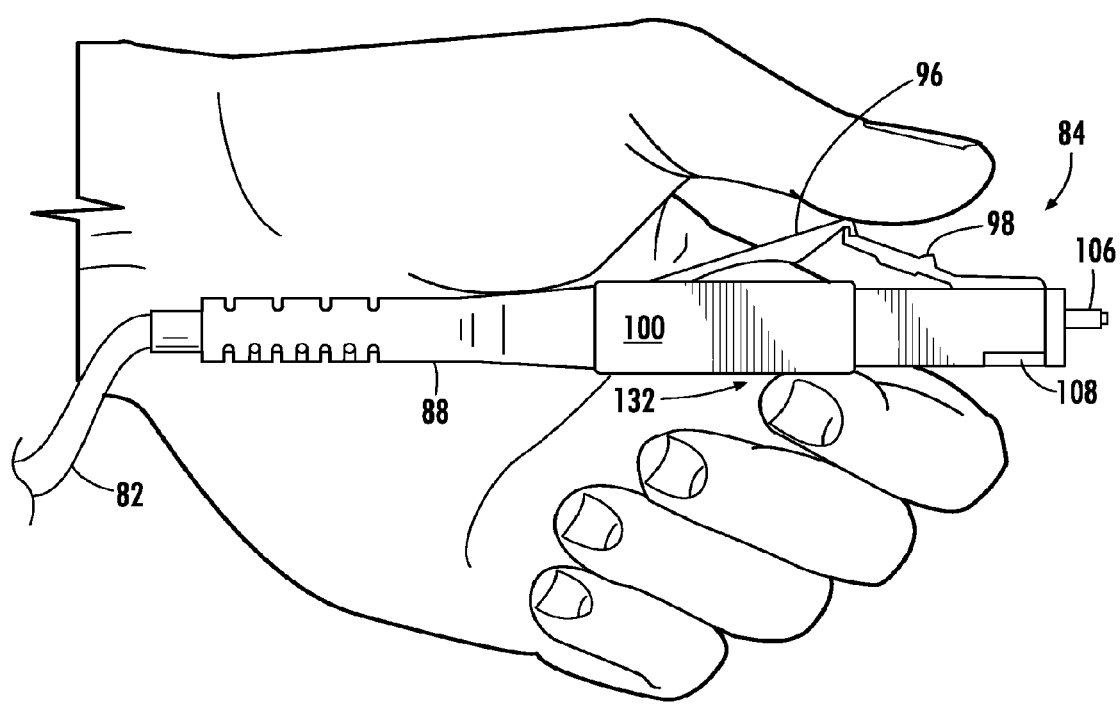
FIG. 8 is a schematic view of the RFID-equipped duplex LC fiber optic connector in FIG. 3 and the integrated RFID IC chip activated by a technician via pressing of an activation button coupled to the RFID circuit.

FIG. 7 illustrates the duplex LC fiber optic connector 84 after fully assembled. FIG. 8 illustrates a schematic view of the duplex LC fiber optic connector 84 in FIG. 3 activated by a technician via pressing on the activation button 132. As previously discussed above, pressing the activation button 132 enables the RFID IC chip 62 to provide information regarding the switch condition detected and may also provide other information, such as identification information relating to the transponder embedded in the RFID IC chip 62 and/or other RFID transponders.

Figure 9:
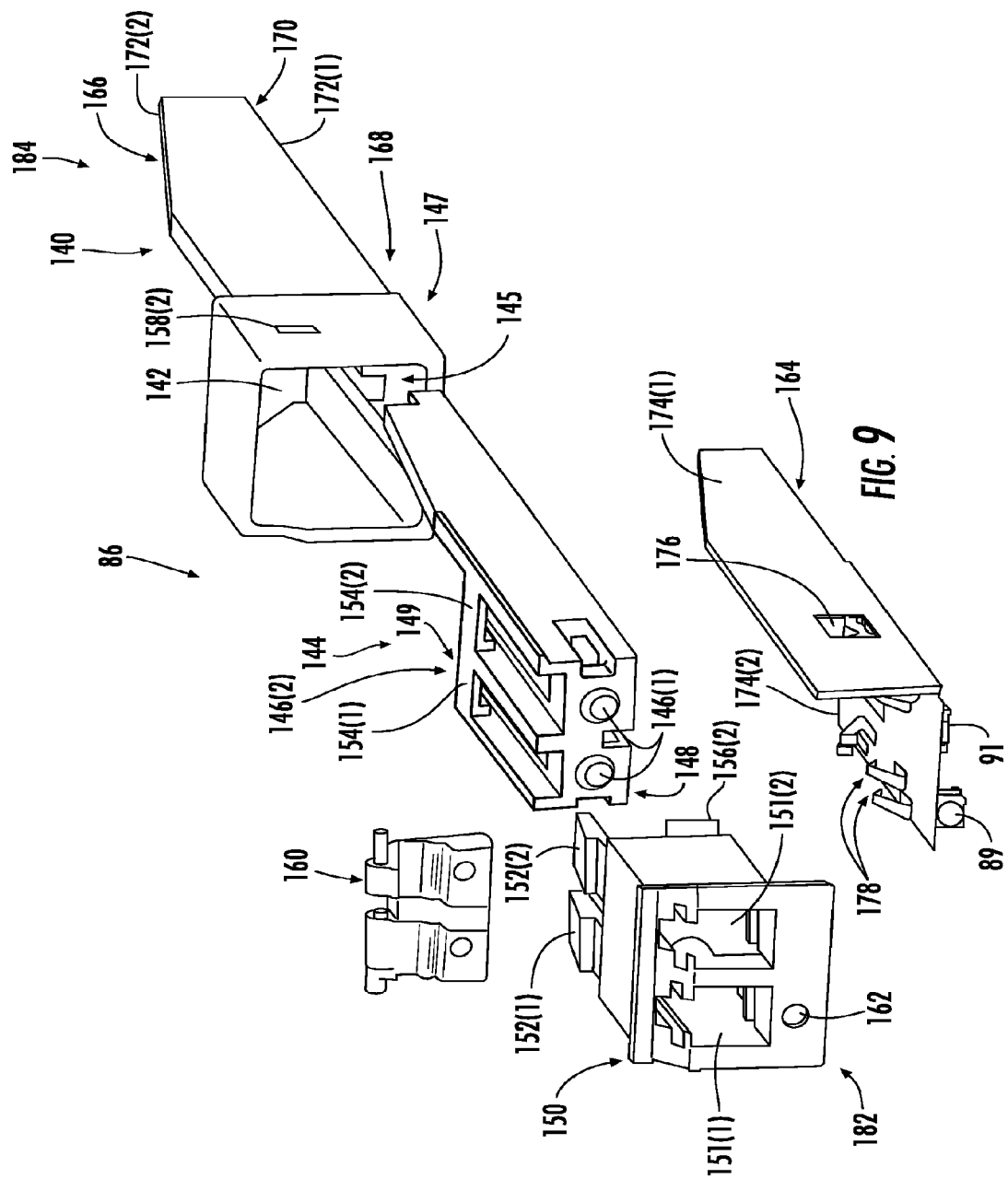
FIG. 9 illustrates a top perspective exploded view of the RFID-equipped duplex LC fiber optic adapter in FIG. 3.

As illustrated in FIG. 3, the duplex LC fiber optic connector 84 is configured to connect to the duplex LC fiber optic adapter 86 to establish both an optical and an electrical connection between RFID IC chips 62 disposed therein. Now that the duplex LC fiber optic connector 84 of FIG. 3 has been described in detail, the duplex LC fiber optic adapter 86 of FIG. 3 will now be described in more detail. In this regard, FIG. 9 illustrates a top perspective exploded view of the duplex LC fiber optic adapter 86 in FIG. 3. Just as provided for the duplex LC fiber optic connector 84, the duplex LC fiber optic adapter 86 is RFID-equipped in a manner that does not alter or change the LC connection type or compatibility of the duplex LC fiber optic adapter 86.

As illustrated in FIG. 9, the duplex LC fiber optic adapter 86 is comprised of an outer adapter housing 140 that supports other components of the duplex LC fiber optic adapter 86 in an outer housing cavity 142 disposed within the outer adapter housing 140. The outer adapter housing 140 is configured to receive a rear inner housing 144 through a front opening 145 in a front portion 147 of the outer adapter housing 140. The rear inner housing 144 contains a first set of ferrule supports 146(1) on a first end 148 of the rear inner housing 144, and a second set of ferrule supports 146(2) on a second end 149 of the rear inner housing 144. Each set of ferrule supports 146(1), 146(2) is configured to support ferrules 106 from the duplex LC fiber optic connector 84 (FIGS. 4A and 4B). The sets of ferrule supports 146(1), 146(2) hold each set of ferrules 106(1), 106(2) in close proximity to each other to establish optical connections between the ferrules 106(1), 106(2) in two duplex LC fiber optic connectors 84(1), 84(2) (not shown) connected on each end 148, 149 of the rear inner housing 144.

Figure 10:
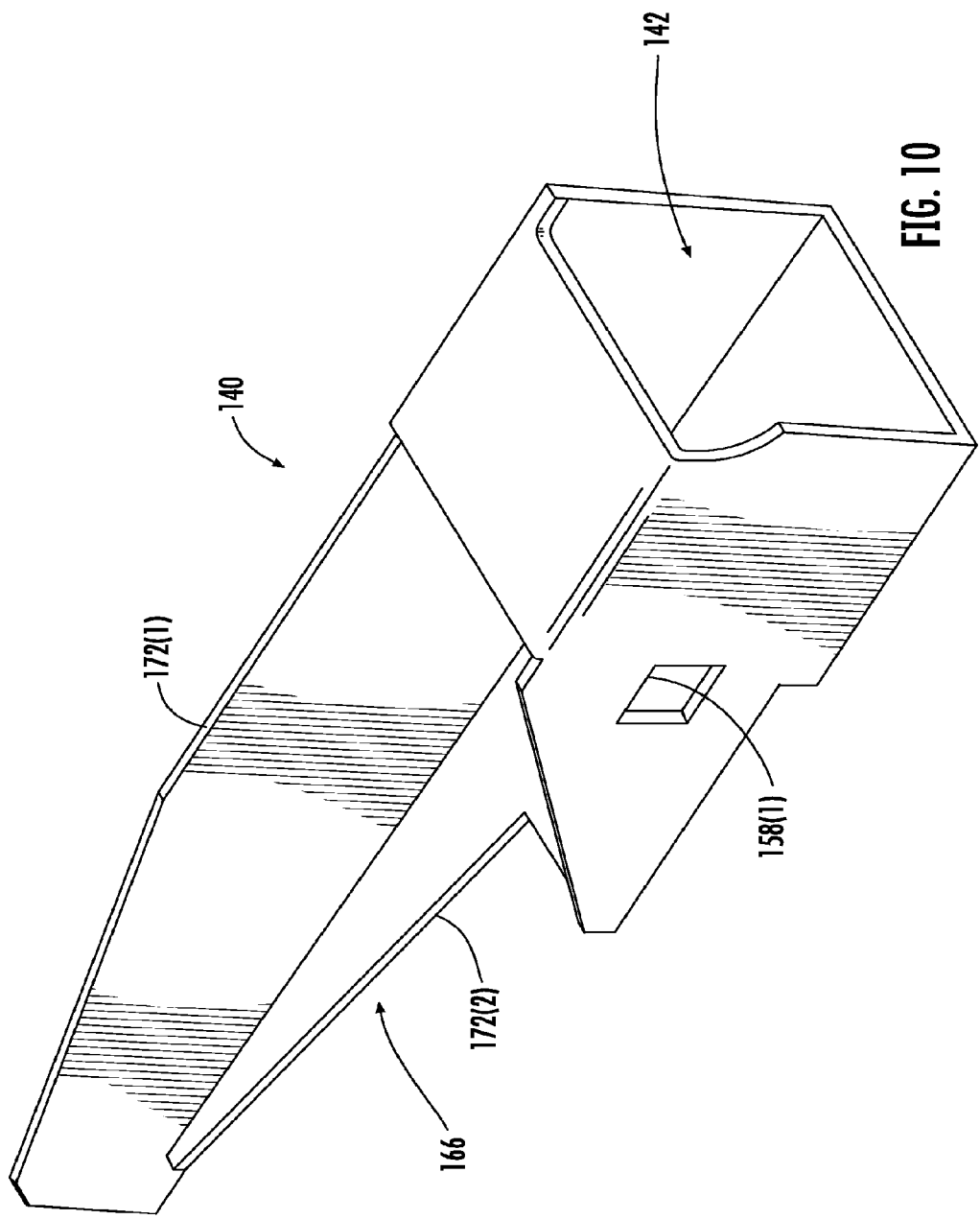
FIG. 10 illustrates a side perspective view of the outer housing of the RFID-equipped duplex LC fiber optic adapter in FIG. 3.
Figure 11:
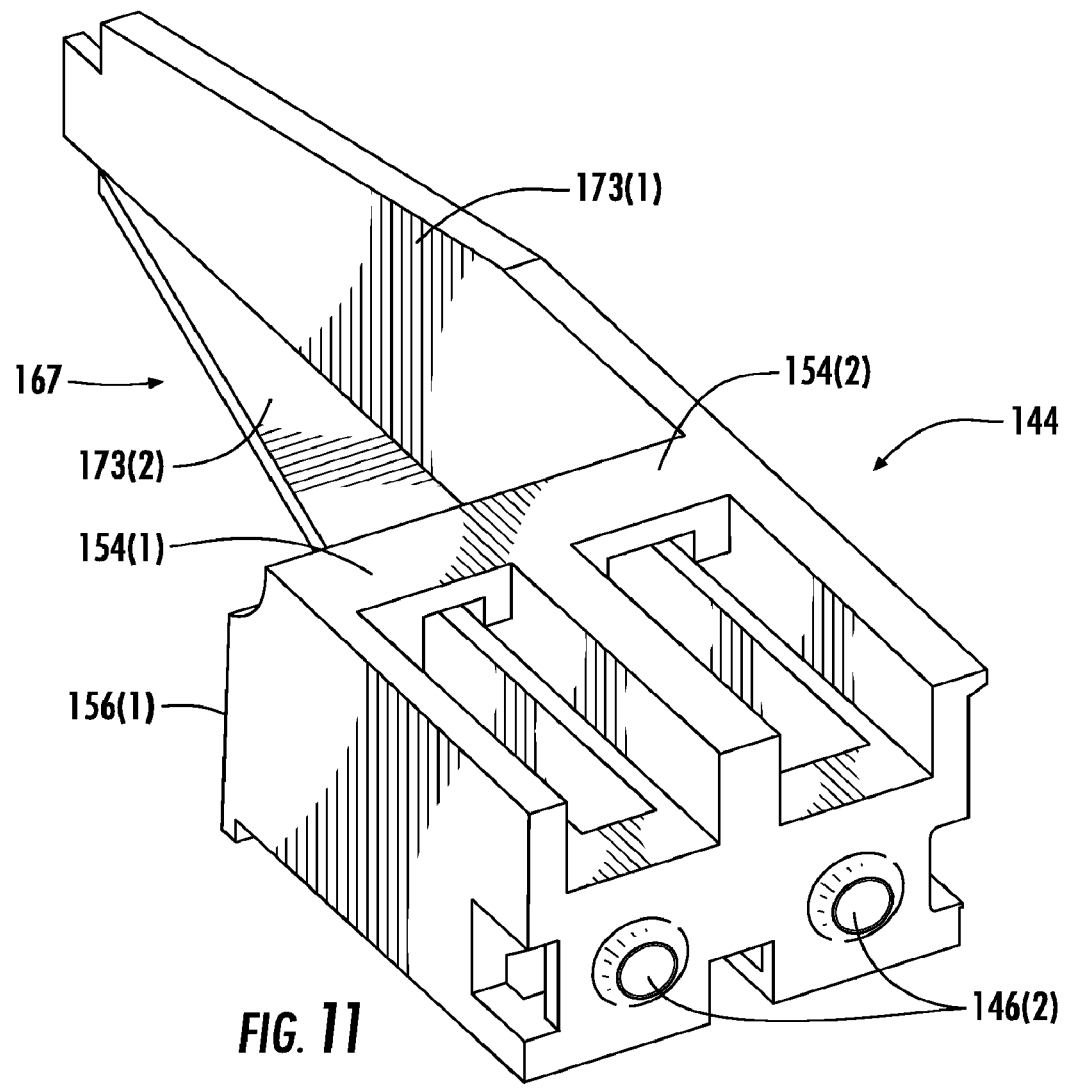
FIG. 11 illustrates a side perspective view of the rear inner housing of the RFID-equipped duplex LC fiber optic adapter in FIG. 3.

Also as illustrated in FIG. 9, a front inner housing 150 is provided that provides two connector passages 151(1), 151(2) to receive the LC connectors from the duplex LC fiber optic connector 84. When inserted, the ferrules 106(1), 106(2) of the duplex LC fiber optic connector 84 are supported by the set of ferrule supports 146 in the rear inner housing 144. The front inner housing 150 is connected to the rear inner housing 144 via flexible latches 152(1), 152(2) disposed in the front inner housing 150 that are biased to be bent downward when inserted into latch holders 154(1), 154(2) disposed in the rear inner housing 144. When fully inserted, the flexible latches 152(1), 152(2) are securely retained in the latch holders 154(1), 154(2). A flexible side latch 156(2) is also disposed in the front inner housing 150 to insert into a latch holder 158(2). This is illustrated in the fully assembled duplex LC fiber optic adapter 86 in FIGS. 12 and 13. A complementary side latch 156(1) is also disposed in the front inner housing 150 that also inserts into a latch holder 158(1), as illustrated in FIGS. 10 and 11.

Turning back to FIG. 9, a shutter door 160 is also provided that is connected inside the front inner housing 150 to provide shutter capability for exposing or covering the two connector passages 151(1), 151(2) into the front inner housing 150. As is well known, a shutter door prevents contaminate from contaminating the internal portions of a fiber optic adapter including ferrule supports that support ferrules to establish an optical connection. FIG. 13 illustrates the fully assembled duplex LC fiber optic adapter 86 with the shutter door 160 closed. Also, as illustrated in FIGS. 9-13, the front inner housing 150 also provides a light orifice 162 configured to receive a light source 89 to provide a visual indicator to a technician or other personnel. As previously discussed, the light source 89 may be a light emitting diode (LED) and may be lit in response to receiving an RF signal from an RFID reader to indicate the proper duplex LC fiber optic adapter 86 to plug in a fiber optic connector in response to an RF communication from the fiber optic connector to an RFID reader.

FIG. 9 also illustrates a circuit substrate 164 that is flexible (also referred to as "flexible electronic circuit 164") provided as part of the duplex LC fiber optic adapter 86. The flexible electronic circuit 164 provides support to the RFID IC chip 62(2) and related circuit in FIG. 2 for RFID and communication capability. The flexible electronic circuit 164 contains similar components as provided in the PCB 108 for the duplex LC fiber optic connector 84. The electronic circuit 164, being flexible in this embodiment, may assist the electronic circuit 164 being conformed to the duplex LC fiber optic adapter 86 when disposed therein. However, if desired, the electronic circuit 164 could also be provided on a PCB. The flexible electronic circuit 164 in this embodiment is placed in the duplex LC fiber optic adapter 86 such that when the duplex LC fiber optic connector 84 is connected, the RFID IC chip 62(2) on the duplex LC fiber optic adapter 86 is electrically coupled to the RFID IC chips 62(1), 62(3) in the duplex LC fiber optic adapter 84 according to the RFID circuit 60 of FIG. 2.

Figure 14B:
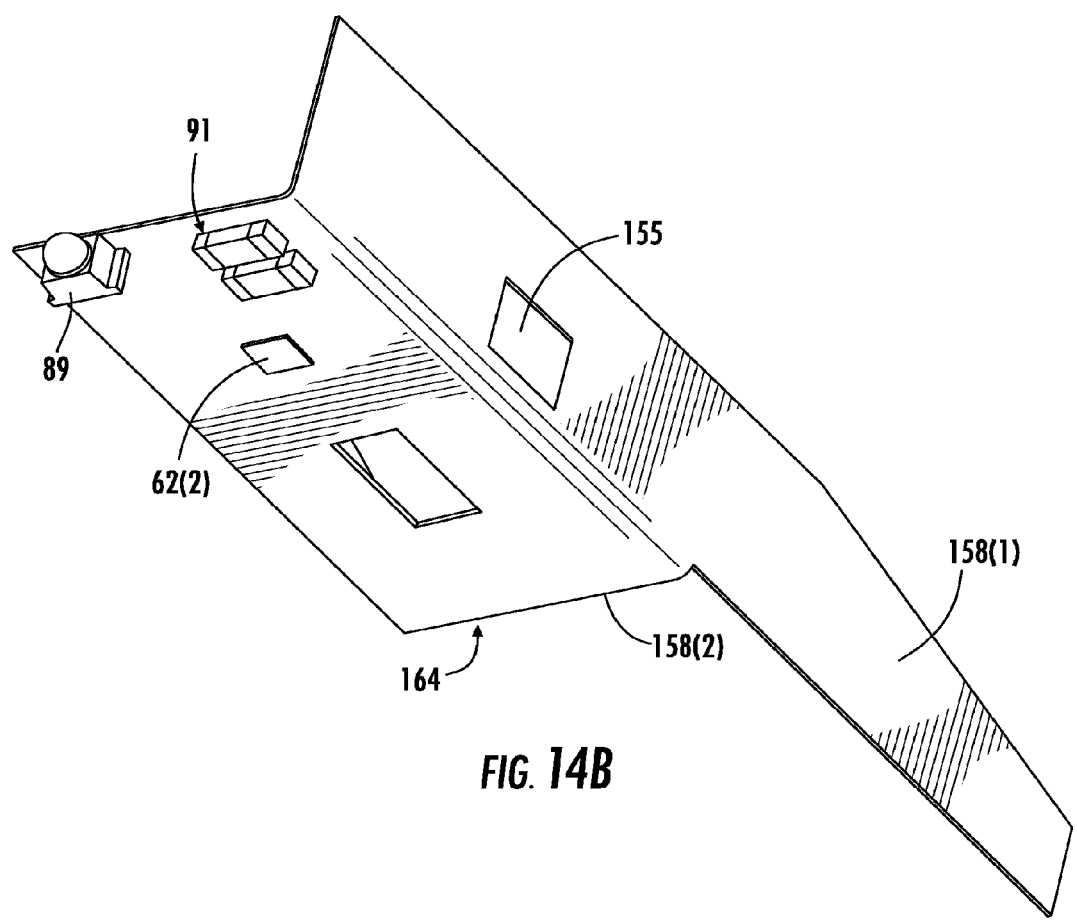
FIG. 14B is a bottom perspective view of the exemplary flexible electronic circuit in FIG. 14A.

The antenna wire 109 or antenna matrices 70(1)-70(3) in the PCB 108 and flexible electronic circuit 164 disposed in the duplex LC fiber optic connector 84 and the duplex LC fiber optic adapter 86, respectively, may also be arranged such that they do not interfere with each other when an electrical coupling is established between the RFID IC chips 62(1), 62(3) and 62(2). In this manner, the antenna components can be separated. Separation of the antenna components may reduce or eliminate overlap in radiation patterns between the antenna components to reduce interference and provide enhanced reception. In this regard, in one embodiment, a platform 166 is provided in the outer adapter housing 140. This is illustrated in FIG. 10. The platform 166 is comprised of two housing portions 172(1), 172(2) connected to each other and arranged in non-parallel planes. In the illustrated example, the two housing portions 172(1), 172(2) are arranged orthogonally or substantially orthogonally. A complementary platform 167 is provided in the rear inner housing 144 of the duplex LC fiber optic adapter 86 as illustrated in FIG. 11, which is also comprised of two orthogonally or substantially orthogonally arranged housing portions 173(1), 173(2). The outer adapter housing 140 is designed to receive and hold the flexible electronic circuit 164 along the platform 166 provided in the outer adapter housing 140 that extends longitudinally from a front portion 168 to an end portion 170 of the outer adapter housing 140 as shown in FIG. 9. As illustrated in FIGS. 14A, 14B and discussed below, the flexible electronic circuit 164 is comprised of similarly arranged orthogonal or substantially orthogonal surfaces comprised of a bottom portion 174(1) and a side portion 174(2) connected orthogonally or substantially orthogonally to the bottom portion 174(1). This allows the flexible electronic circuit 164 to mate within the outer housing adapter 140.

To hold the flexible electronic circuit 164 in place, the rear inner housing 144 is inserted into the outer adapter housing 140 with the flexible electronic circuit 164 bottom portion 174(1) and side portion 174(2) trapped between the housing portions 172(1), 173(1), and 172(2), 173(2). The antenna matrix 70(2) of the duplex LC fiber optic adapter 86 is embedded in the side portion 174(2) of the flexible electronic circuit 164. In this manner, when the duplex LC fiber optic connector 84 is connected to the duplex LC fiber optic adapter 86, the antenna matrix 70(2) is contained in a non-parallel plane to the plane of the antenna matrices 70(1), 70(3) of the duplex LC fiber optic connector 84 to be separated from each other. This can reduce or eliminate interference between the antenna matrices 70(2) and 70(1), 70(3) and/or their antenna wires 109 when receiving RF signals. The overlap between radiation patterns of the two antenna matrices 70(1), 70(2) are reduced or eliminated. Further, separation of the two antenna matrices 70(1), 70(2) can provide enhanced reception. The antenna matrix 70 may also be arranged on the fiber optic components to allow technicians to easily insert or remove fiber optic components when panel-mounted in a dense array.

Note that the present invention is not limited to providing a platform. The two housing portions 172(1), 172(2) forming the platform 166 or the complementary platform 167 do not have to be arranged orthogonally or substantially orthogonally. Any arrangement for the holding the flexible electronic circuit 164 in the duplex LC fiber optic adapter 86 may be employed.

To connect the flexible electronic circuit 164 to the duplex LC fiber optic adapter 86, the flexible electronic circuit 164 is inserted inside the outer adapter housing 140 against the inside of the platform 166. The flexible electronic circuit 164 is held between the inside of the platform 166 and the outside of the front inner housing 150 and rear inner housing 144 when inserted inside the outer housing cavity 142 of the outer adapter housing 140. The flexible electronic circuit 164 contains a first opening 176 that allows the flexible side latch 156(2) disposed in the front inner housing 150 to insert into the latch holder 158(2) as illustrated in FIG. 12.

Figure 12:
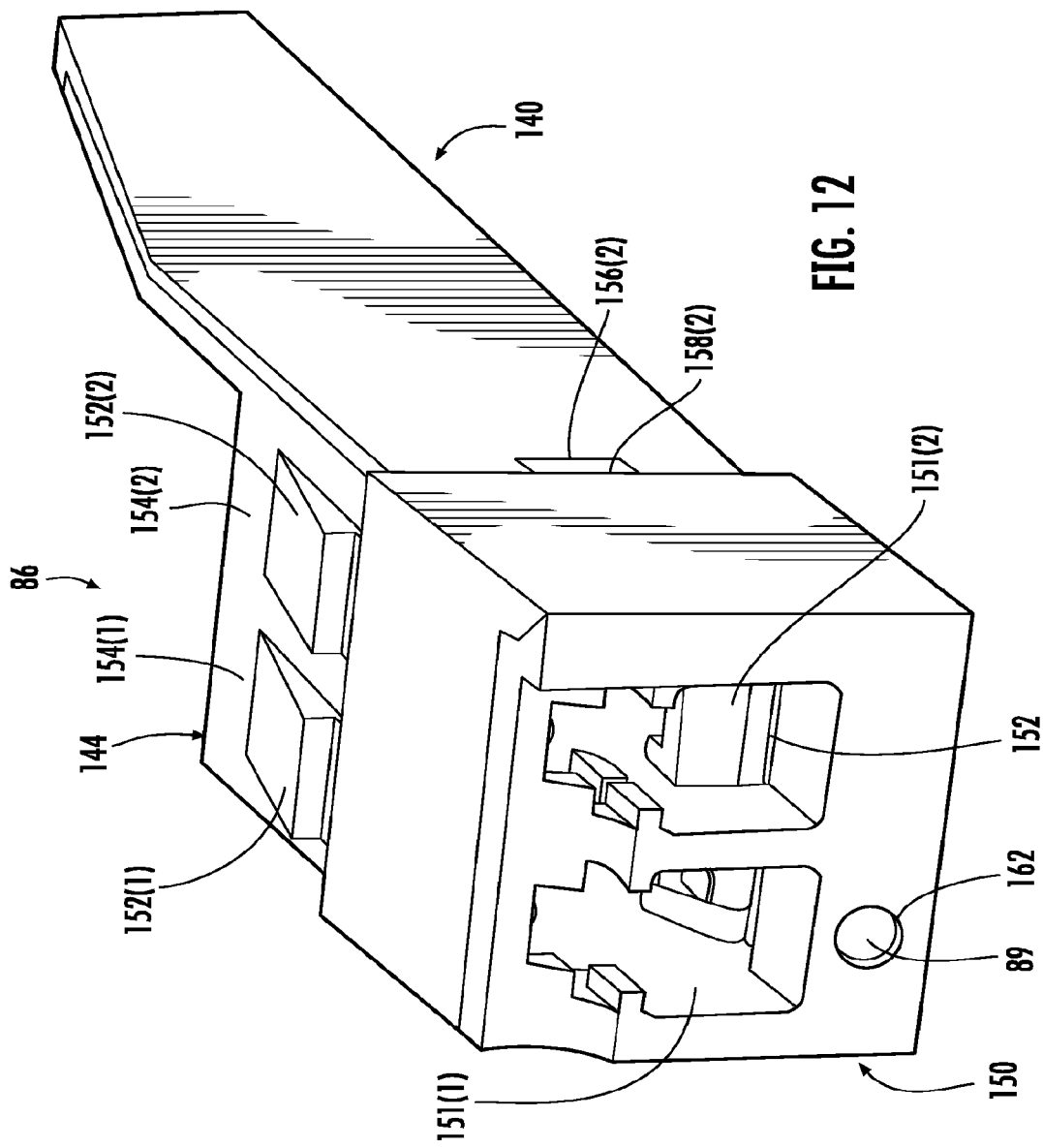
FIG. 12 illustrates a top perspective view of a fully assembled RFID-equipped duplex LC fiber optic adapter in FIG. 3.
Figure 13:
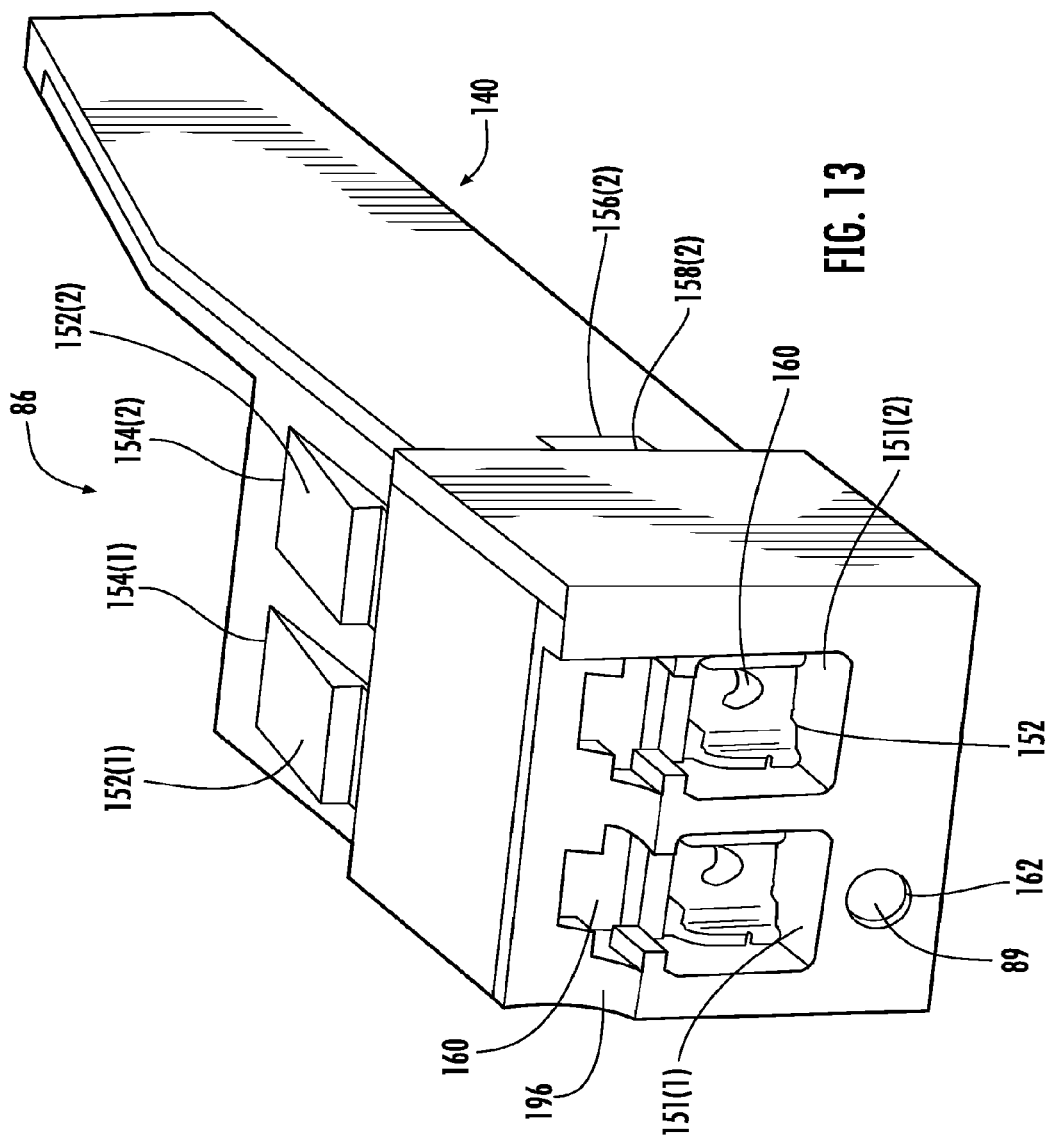
FIG. 13 illustrates a top perspective view of a fully assembled RFID-equipped duplex LC fiber optic adapter in FIG. 3 with its shutter door opened.

As illustrated in FIGS. 12 and 14A-14B, the flexible electronic circuit 164 also contains adapter electrical contacts 178 that protrude through the outer adapter housing 140 and the front inner housing 150 into the connector passages 151(1), 151(2) when placed inside the outer housing cavity 142 of the outer adapter housing 140 against the platform 166. When the duplex LC fiber optic connector 84 is connected to the duplex LC fiber optic adapter 86, the electrical contacts 128 (FIG. 5) of the duplex LC fiber optic connector 84 contact the adapter electrical contacts 178 of the duplex LC fiber optic adapter 86. This contact automatically establishes an electrical coupling between the RFID IC chip 62(1) or 62(3) in the PCB 108 of the duplex LC fiber optic connector 84 and the RFID IC chip 62(2) in the flexible electronic circuit 164 of the duplex LC fiber optic adapter 86 according to the RFID circuit 60 of FIG. 2. Specifically, the ground line 74 and the serial bus communication line 79 are coupled to each other to activate the RFID IC chips 62(1), 62(3) and 62(2) in the connected duplex LC fiber optic connector 84 and the duplex LC fiber optic adapter 86, as previously described.

Figure 15:
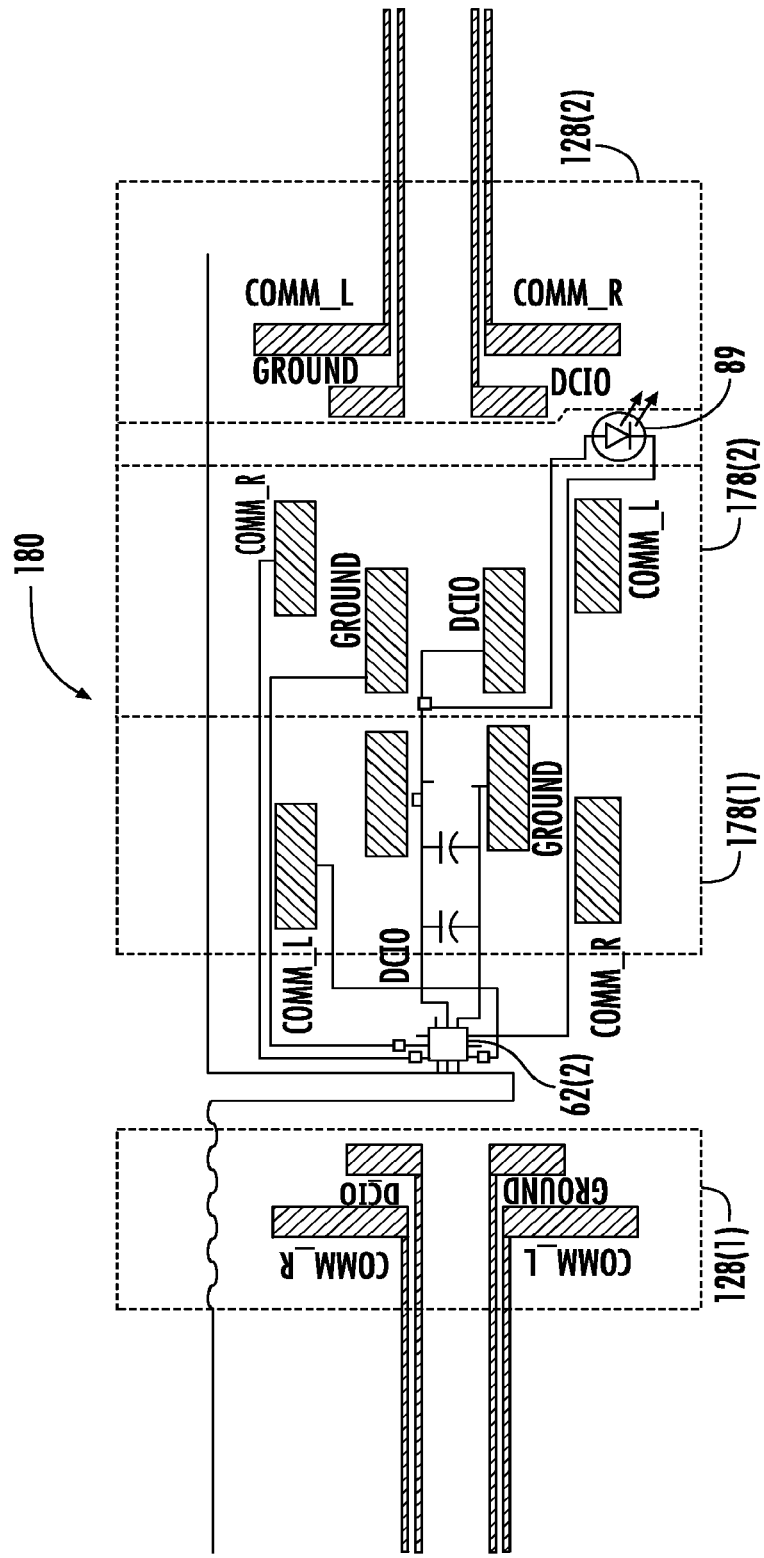
FIG. 15 is a schematic diagram of an exemplary circuit layout for an RFID-equipped fiber optic connector and a fiber optic adapter arrangement according to the RFID circuit diagram in FIG. 2.

In this regard, FIGS. 14A and 14B illustrate top and bottom perspective views, respectively, of the flexible electronic circuit 164 for the duplex LC fiber optic adapter 86 with the adapter electrical contacts 178. The adapter electrical contacts 178 are coupled to the electrical contacts 128 of the PCB 108 of the duplex LC fiber optic connector 84 according to a electrical connection layout 180 in FIG. 15 to connect the RFID IC chip 62(2) of the duplex LC fiber optic adapter 86 to the RFID IC chips 62(1), 62(3) of the duplex LC fiber optic connector 84 when connected to the duplex LC fiber optic adapter 86. As illustrated in FIG. 14A, a top perspective view of the flexible electronic circuit 164 is shown. Two sets of adapter electrical contacts 178(1), 178(2) are provided in the flexible electronic circuit 164 to couple the RFID IC chip 62(2) in the duplex LC fiber optic adapter 86 to the RFID IC chips 62(1), 62(3) in two duplex LC fiber optic connectors 84(1), 84(2) when connected to the duplex LC fiber optic adapter 86 according to the RFID circuit 60 of FIG. 2. The first set of adapter electrical contacts 178(1) in the flexible electronic circuit 164 of the duplex LC fiber optic connector 84(1) are inserted into the duplex LC fiber optic adapter 86. The second set of adapter electrical contacts 178(2) in the flexible electronic circuit 164 of the duplex LC fiber optic connector 84(2) are also inserted into the duplex LC fiber optic adapter 86. The adapter electrical contacts 178(1), 178(2) are coupled via traces (not shown) in the flexible electronic circuit 164 to the RFID IC chip 62(2) mounted on the flexible electronic circuit 164 as shown in FIG. 14B. The RFID IC chip 62(2) is coupled to the capacitor bank 91 (FIG. 2) and the light source 89 as previously described in the RFID circuit 60 of FIG. 2. This is further illustrated in the electrical contacts connection layout 180 of FIG. 15. Therein, the adapter electrical contacts 178(1), 178(2) are shown according to the connectivity of the RFID IC chip 62(2) and supporting circuitry in the RFID circuit 60 of FIG. 2.

Figure 16:
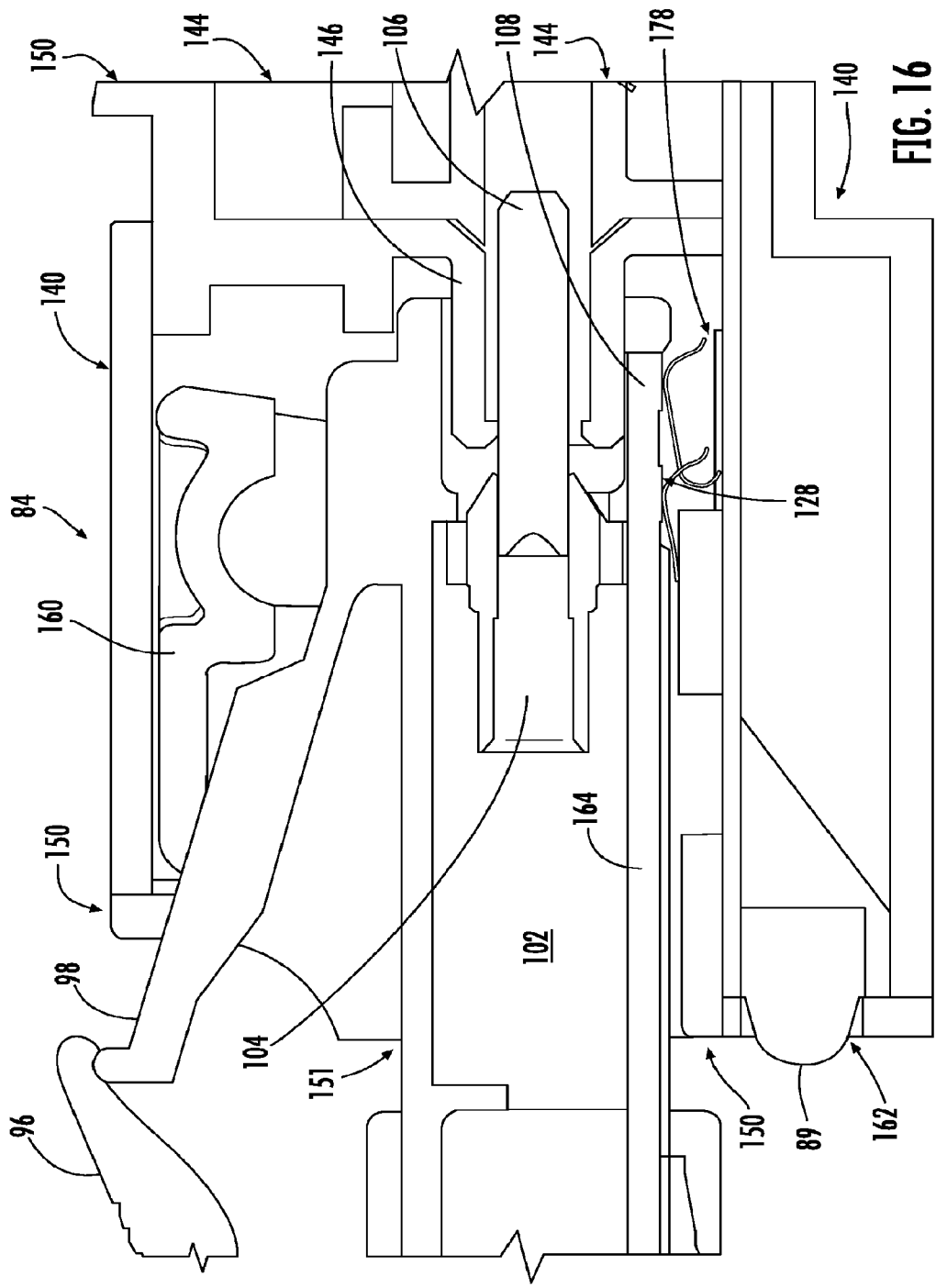
FIG. 16 is a cross-sectional view of the RFID-equipped duplex LC fiber optic connector connected to the RFID-equipped duplex LC fiber optic adapter in FIG. 3.

FIG. 16 is a cross-sectional view of the connection between the duplex LC fiber optic connector 84 and the duplex LC fiber optic adapter 86 when attached to each other. FIG. 16 shows the connection of the adapter electrical contacts 178 from the flexible electronic circuit 164 to the electrical contacts 128 of the PCB 108. As shown, the RFID IC chip 62 from the duplex LC fiber optic connector 84 is automatically connected to the duplex LC fiber optic adapter 86 when the connection is established. The duplex LC fiber optic connector 84 and the ferrule 106 are inserted into the connector passage 151 of the duplex LC fiber optic adapter 86. The ferrule 106 is inserted into the ferrule support 146 to establish an optical connection. When the ferrule 106 is inserted fully into the ferrule support 146, the electrical contacts 128 on the PCB 108 of the duplex LC fiber optic connector 84 are arranged such that they automatically contact corresponding adapter electrical contacts 178 on the flexible electronic circuit 164 of the duplex LC fiber optic adapter 86. As a result, an electrical coupling between the RFID IC chips 62(1), 62(3) and 62(2) of the duplex LC fiber optic connector 84 and the duplex fiber optic adapter 86 is established.

Figure 17:
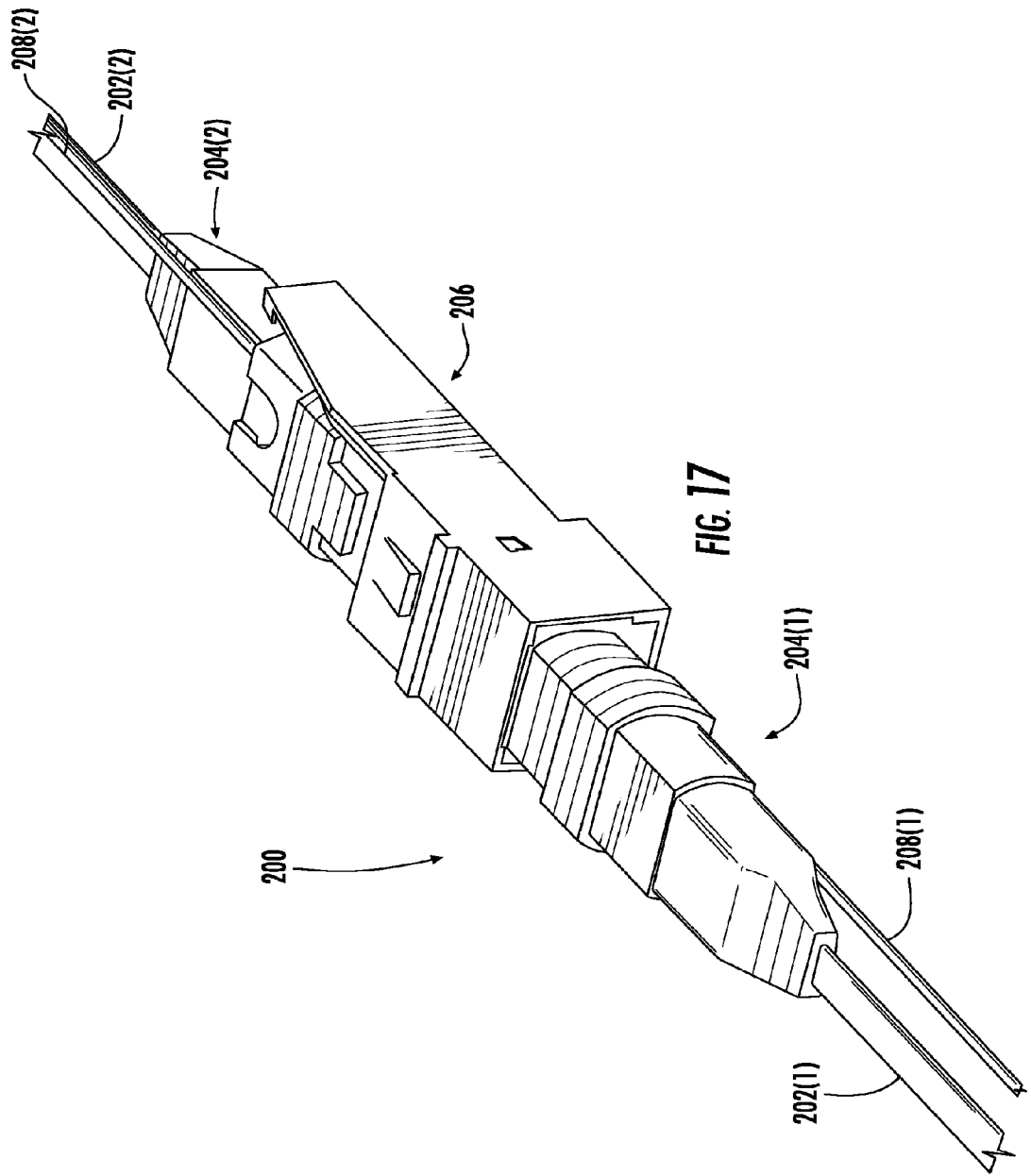
FIG. 17 illustrates a top perspective view of an exemplary fiber optic connection arrangement between two RFID-equipped MTP fiber optic connectors through an exemplary intermediary RFID-equipped MTP fiber optic adapter.

The concepts disclosed herein are not limited to any particular optical connection type, including an LC connection type. The concepts disclosed herein may be applied to any type of optical connection or connector type. As another example, FIG. 17 illustrates an example of an RFID-equipped MTP fiber optic connector and adapter arrangement 200. The MTP fiber optic connector and adapter arrangement 200 provides an MTP connection arrangement for MTP fiber optic cables 202(1), 202(2). The RFID-equipped MTP fiber optic connector and adapter arrangement 200 is comprised of two MTP fiber optic connectors 204(1), 204(2) connected to an MTP fiber optic adapter 206. As will be discussed in more detail below, the MTP fiber optic connectors 204(1), 204(2) and the MTP fiber optic adapter 206 each include the RFID IC chips 62(1)-62(3) illustrated in FIG. 2 and the antenna matrices 70(1)-70(3) for RF communications to a transponder embedded in the RFID IC chips 62(1)-62(3). Antenna wires 208(1), 208(2) are shown in FIG. 17 extending from each of the MTP fiber optic connectors 204(1), 204(2). The MTP fiber optic connectors 204(1), 204(2) and the MTP fiber optic adapter 206 include certain components and features that provide an electrical connection between the RFID IC chips 62(1)-62(3) when the MTP fiber optic connectors 204(1), 204(2) are connected to the MTP fiber optic adapter 206. In this manner, not only are the MTP fiber optic connectors 204(1), 204(2) and the MTP fiber optic adapter 206 RFID-equipped to provide information about their connector or support fiber optic cable, or adapter, as the case may be, to an RFID reader, but the MTP fiber optic connectors 204(1), 204(2) and the MTP fiber optic adapter 206 can communicate information to each other when a connection between them is established. For example, the MTP fiber optic connector 204(1) may communicate a unique identification (ID) to the MTP fiber optic adapter 206 when a connection is established. This allows an RFID reader, by interrogating the MTP fiber optic connector and/or adapter 204(1), 206, to be aware of the physical connection for any number of reasons, including connection mapping, etc.

Figure 18:
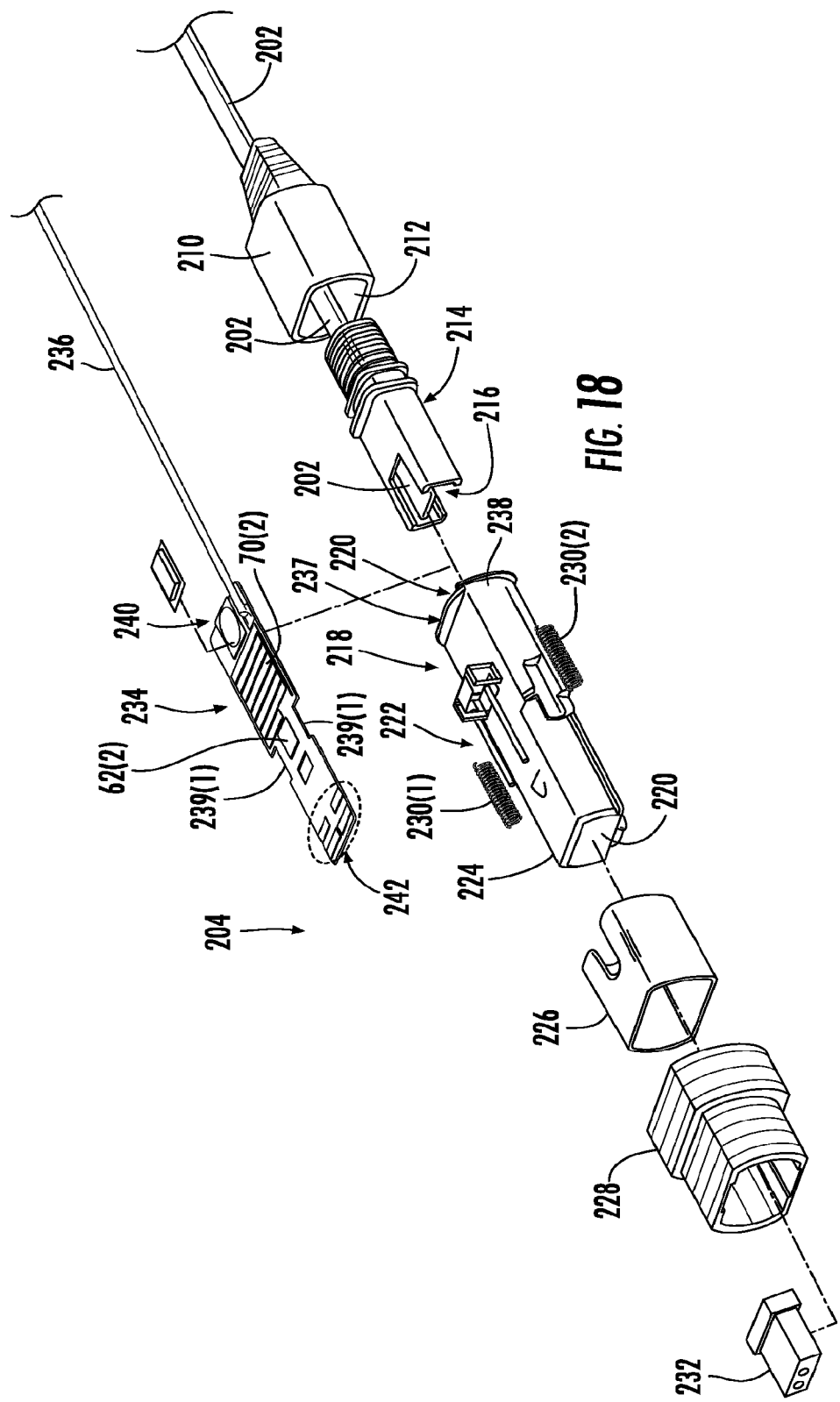
FIG. 18 illustrates a top perspective exploded view of the RFID-equipped MTP fiber optic connector in FIG. 17.

Just as for the LC type fiber optic connectors 84 and adapter 86 in FIGS. 3-16, when providing either RFID-equipped MTP fiber optic connectors or adapters 204, 206, an arrangement to provide electrical connection between the two when connected, or both, it may be desirable to maintain backwards compatibility of the MTP connection type. In this regard, FIG. 18 illustrates a top perspective exploded view of the MTP fiber optic connector 204 illustrated in FIG. 17. The various components of the MTP fiber optic connector 204 are illustrated and will be described in more detail in FIGS. 19-23. As illustrated in FIG. 18, the MTP fiber optic connector 204 is comprised of a boot 210 that receives a MTP fiber optic cable 202 through a boot passage 212 disposed within the boot 210. A crimp body 214 is received in the boot passage 212 to connect to the boot 210 and is configured to receive the MTP fiber optic cable 202 extending through the boot passage 212 through a crimp body passage 216. A crimp body 214 carrying the MTP fiber optic cable 202 is configured to be inserted and attached to an inner housing 218 that defines an inner housing passage 220 therein to receive the MTP fiber optic cable 202. A trigger mechanism 222 is disposed on an outside surface 224 of the inner housing 218. An outer housing 226 is placed over the inner housing 218 and a trigger housing 228 is placed over the outer housing 226 and the inner housing 218 overtop the trigger mechanism 222. Depressing the trigger housing 228 detents the trigger mechanism 222 to release the MTP fiber optic connector 204 to remove it from the MTP fiber optic adapter 206. Springs 230(1), 230(2) are disposed on each side of the inner housing 218 to provide a spring-loaded fit between the outer housing 226 and the inner housing 218 when the trigger housing 228 is installed over the outer housing 226 and the inner housing 218. An MTP ferrule 232 is disposed in the inner housing passage 220 such that it protrudes through the trigger housing 228 when the MTP fiber optic connector 204 is fully assembled.

FIG. 18 also illustrates a substrate provided in the form of a PCB 234 that contains the RFID IC chip 62(2) and related circuitry provided in FIG. 2 for providing RFID communication functionality for the MTP fiber optic connector 204. The PCB 234 in this embodiment is semi-rigid like PCB 108, but could be completely rigid or flexible. An antenna wire 236 coupled to the antenna matrix 70(2) provided in the PCB 234 extends from the PCB 234. The antenna wire 236 will extend from the PCB 234 inside the trigger housing 228 and the outer housing 226 when the MTP fiber optic connector 204 is fully assembled. In one embodiment, the antenna wire 236 forms a monopole antenna, although the antenna may be of any type. So that the PCB 234 can be provided as part of the MTP fiber optic connector 204 without affecting or altering the connector type and to provide backwards compatibility between the MTP fiber optic connector 204 and MTP fiber optic adapters 206, the PCB 234 is installed on the outside surface 224 of the inner housing 218. A protrusion 237 is disposed on a rear end 238 of the inner housing 218 to retain a rear end 240 of the PCB 234. The PCB 234 also contains two recesses 239(1), 239(2) to allow the PCB 234 to fit inside the trigger mechanism 222 when installed on the outer surface 224 of the inner housing 218.

Figure 19:
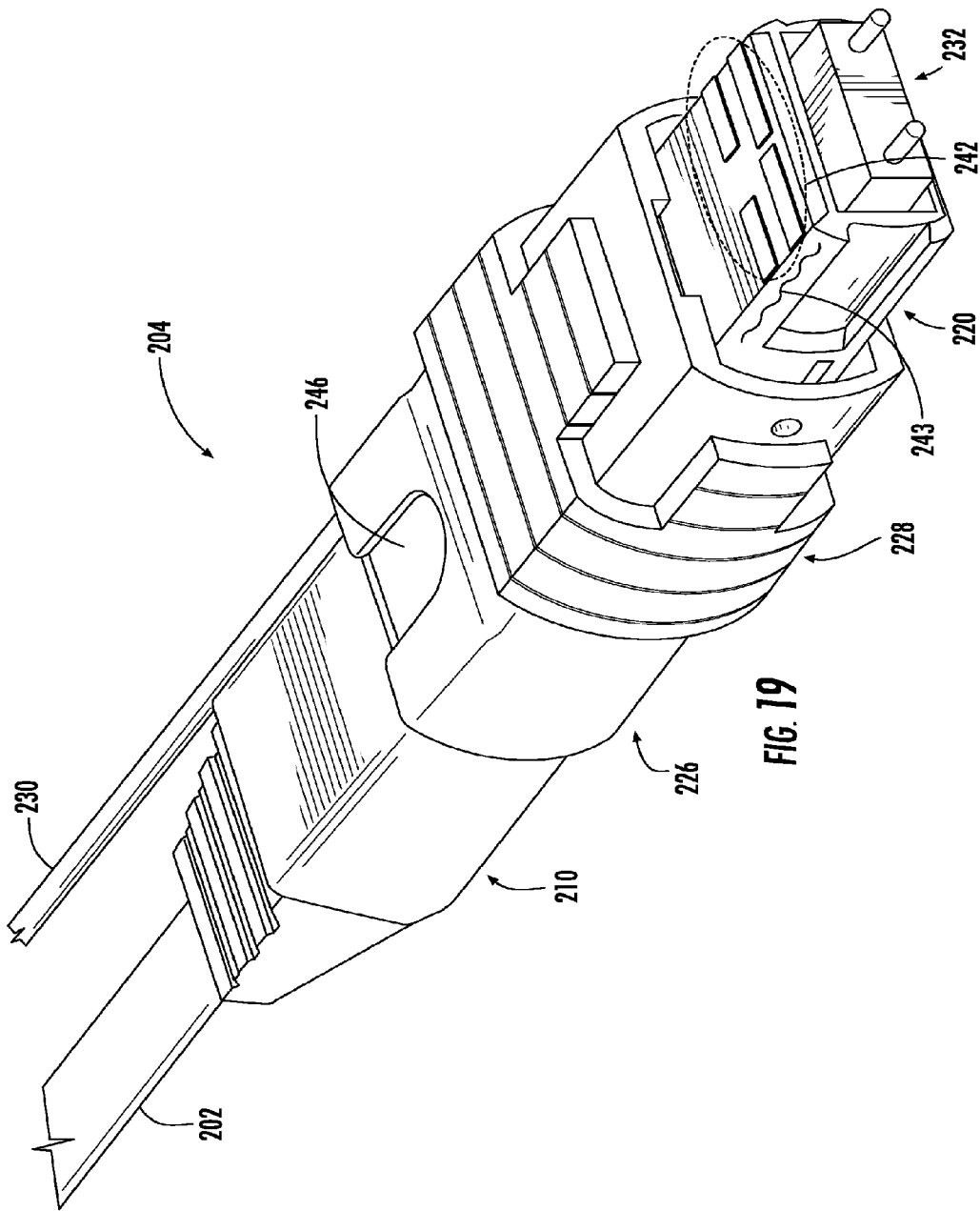
FIG. 19 is a schematic diagram of an exemplary PCB configured to be attached to the RFID-equipped MTP fiber optic connector in FIG. 17 to provide an integrated RFID circuit.

As illustrated in FIG. 19, electrical contacts 242 will be exposed on an exposed portion 243 of the inner housing 218 when the MTP fiber optic connector 204 is fully assembled. An adhesive may be placed on the surface of the PCB 234 abutting the outside surface 224 of the inner housing 218 before the PCB 234 is installed. The adhesive bonds the exposed portion 243 of the PCB 234 to the outside surface 224 of the inner housing 218. The adhesive may be any type of adhesive or epoxy. Exposing the electrical contacts 242 allows an electrical contact to be established with electrical contacts disposed in the MTP fiber optic adapter 206 when the MTP fiber optic connector 204 is connected to the MTP fiber optic adapter 206. In this manner, the electrical connectivity can be established to the PCB 234 in the MTP fiber optic connector 204 without interfering with standard MTP hardware and components in the MTP fiber optic connector 204. Thus, the MTP fiber optic connector 204 is backwards compatible with a standard MTP type connection.

Figure 20:
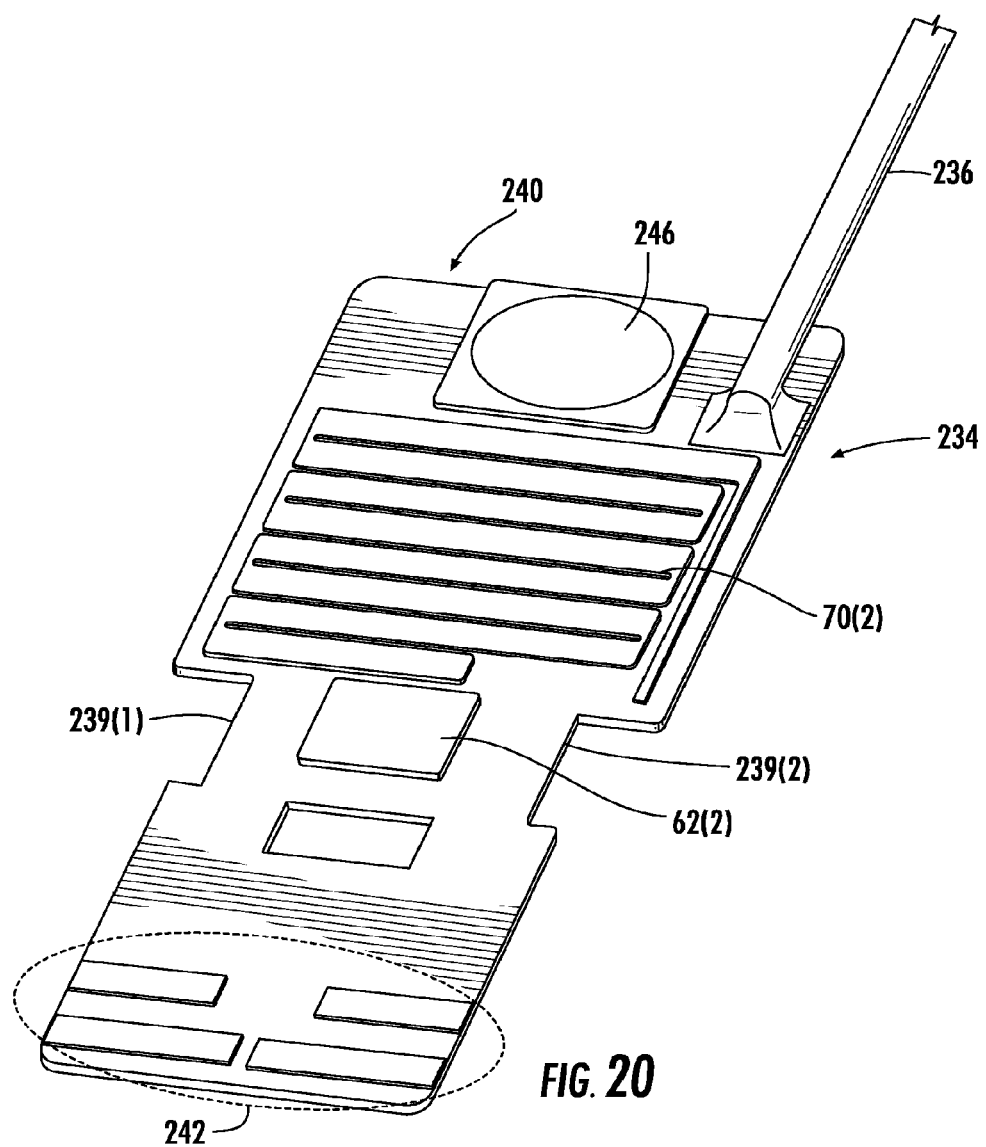
FIG. 20 illustrates a top perspective view of the RFID-equipped MTP fiber optic connector in FIG. 17.

FIG. 20 illustrates the PCB 234 for the MTP fiber optic connector 204 in more detail. The PCB 234 establishes the circuit for the fiber optic connectors 64(1), 64(2) illustrated in the RFID circuit 60 of FIG. 2. As illustrated in FIG. 20, the PCB 234 contains the RFID IC chip 62(2). Traces (not shown) provided to the PCB 234 connect pins of the RFID IC chip 62(2) to the electrical contacts 242. These electrical contacts 242 are conductive leads that establish an electrical connection to the RFID IC chip 62(2) when the MTP fiber optic connector 204 is connected to the MTP fiber optic adapter 206, as illustrated in FIG. 17. As will be discussed in more detail later in this application, the electrical contacts 242 are designed to interface with electrical contacts provided in the MTP fiber optic adapter 206 to establish an electrical circuit between RFID IC chips 62(1), 62(3) disposed in MTP fiber optic connectors 204(1), 204(2) and the RFID IC chip 62(2) disposed in the MTP fiber optic adapter 206, like illustrated in FIG. 15. The RFID IC chip 62(2) is also coupled to the antenna matrix 70(2) provided in the PCB 234, which is coupled to the antenna wire 236 extending out from the PCB 234. An activation button 246 is also provided to provide the switch 85 in FIG. 2 that enables the RFID IC chip 62(2) to allow RF communications with the transponder embedded therein, as previously described.

Figure 21:
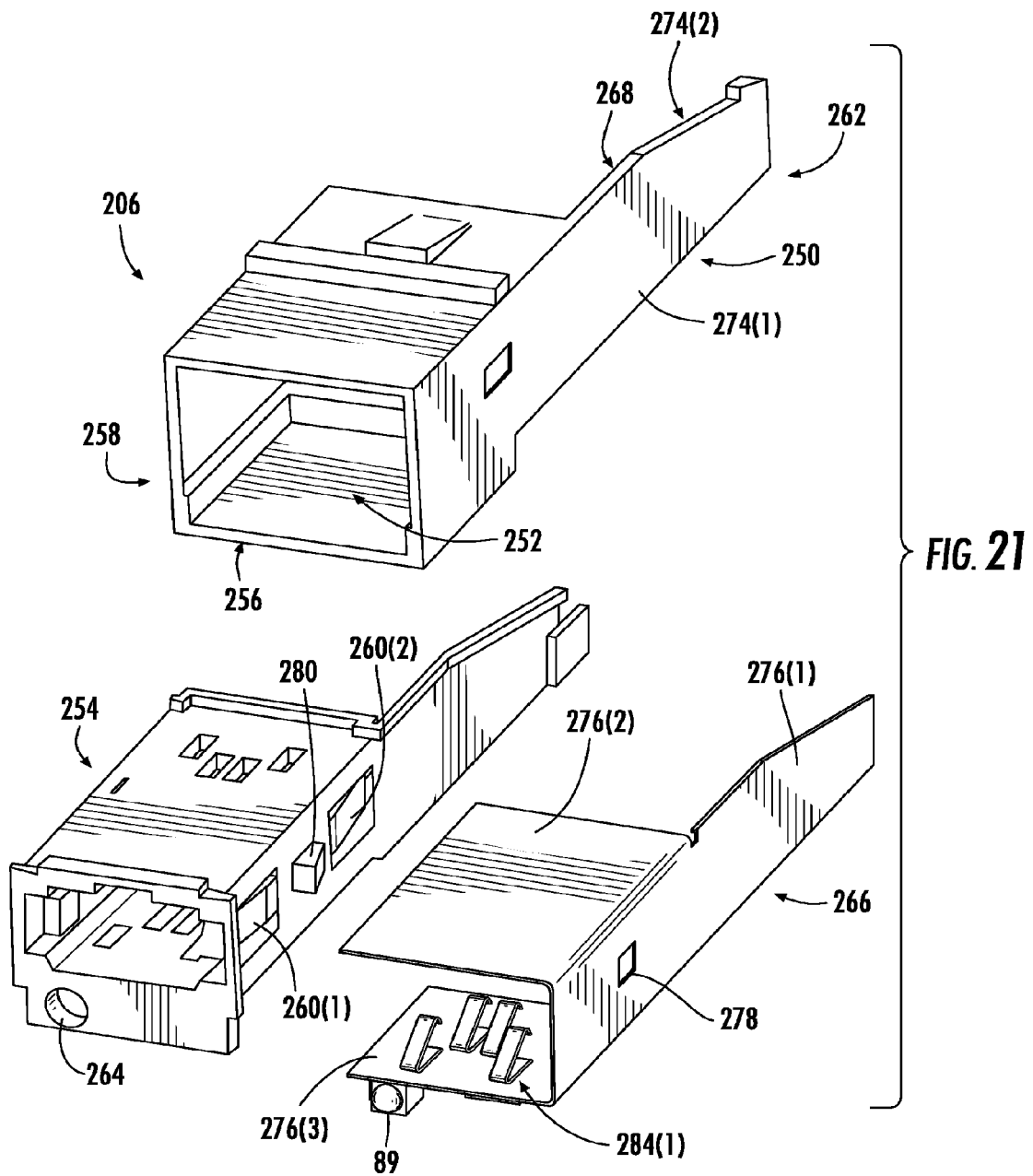
FIG. 21 illustrates a top perspective exploded view of the RFID-equipped MTP fiber optic adapter in FIG. 17.
Figure 22:
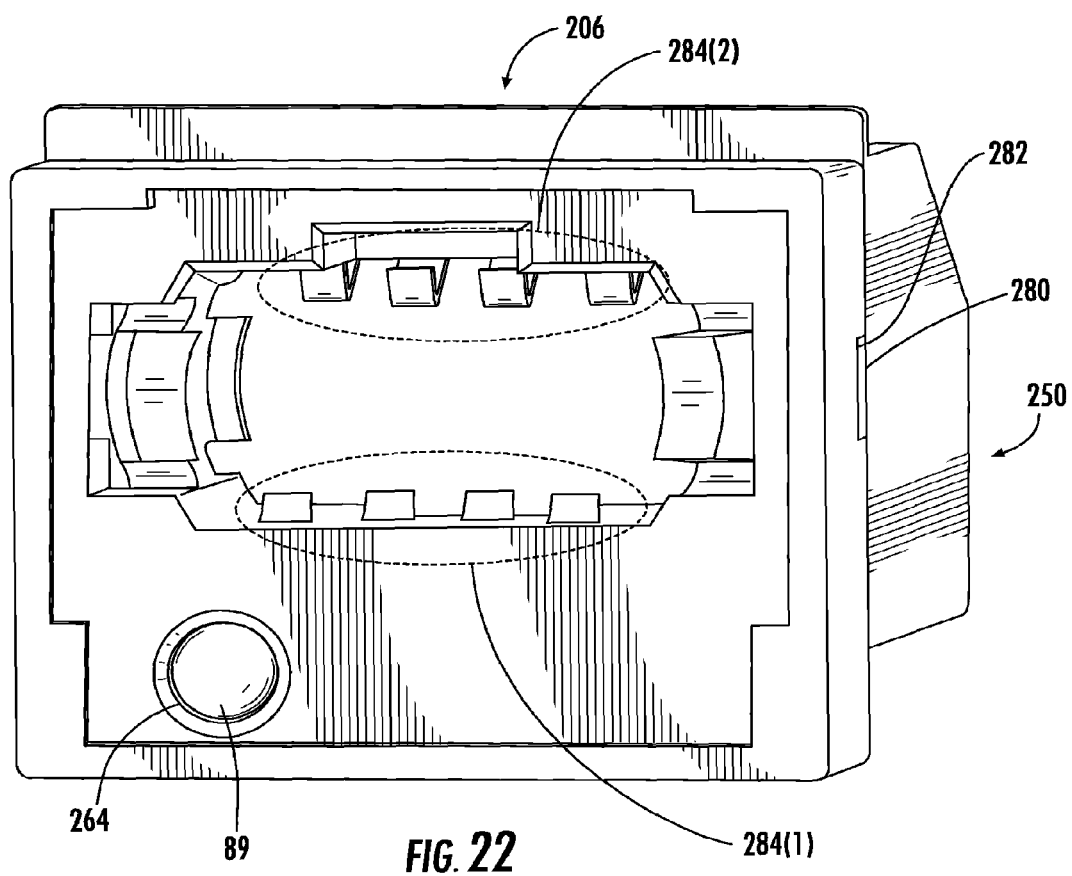
FIG. 22 illustrates a top perspective view of the RFID-equipped MTP fiber optic adapter in FIG. 17.

As illustrated in FIG. 17, the MTP fiber optic connector 204 is configured to connect to the MTP fiber optic adapter 206 to establish both an optical and an electrical connection between RFID IC chips 62 disposed therein. Now that the MTP fiber optic connector 204 has been described in detail, the MTP fiber optic adapter 206 will now be described in more detail. FIG. 21 illustrates a top perspective exploded view of the MTP fiber optic adapter 206 in FIG. 17. Just as provided for the MTP fiber optic connector 204, the MTP fiber optic adapter 206 is RFID-equipped in a manner that does not alter or change the LC connection type or compatibility of the MTP fiber optic adapter 206. FIG. 22 illustrates the MTP fiber optic adapter 206 when fully assembled.

As illustrated in FIG. 21, the MTP fiber optic adapter 206 is comprised of an outer adapter housing 250 that supports other components of the MTP fiber optic adapter 206 in an outer housing cavity 252 disposed within the outer adapter housing 250. The outer adapter housing 250 is configured to receive an inner housing 254 through a front opening 256 in a front portion 258 of the outer adapter housing 250. A first ferrule support 260(1) and a second ferrule support 260(2) are disposed within the inner housing 254. Each ferrule support 260(1), 260(2) is configured to support MTP ferrules 232 from the MTP fiber optic connector 204. The ferrule supports 260(1), 260(2) hold each of the MTP ferrules 232 from an MTP fiber optic connector 204(1), 204(2) in close proximity to each other to establish optical connections between the MTP fiber optic connectors 204(1), 204(2) connected on the front portion 258 and a rear end 262 of the outer adapter housing 250. The inner housing 254 also provides a light orifice 264 configured to receive the light source 89 to provide a visual indicator to a technician or other personnel. As previously discussed, the light source 89 may be an LED and may be lit in response to receiving an RF signal from the RFID reader 14 to indicate the proper fiber optic adapter 86 to plug in a fiber optic connector in response to an RF communication from the fiber optic connector to the RFID reader 14.

FIG. 21 also illustrates a circuit substrate 266 (also referred to herein as "flexible electronic circuit 266") provided as part of the MTP fiber optic adapter 206 and which is flexible like the flexible electronic circuit 164. However, the electronic circuit 164 could also be provided on a PCB if desired. The flexible electronic circuit 266 in this embodiment provides support for the RFID IC chip 62(2) and related circuitry in FIG. 2 for RFID and communication capability. The flexible electronic circuit 266 contains similar components as provided in the PCB 234 for the MTP fiber optic connector 204. The flexible electronic circuit 266 is placed in the MTP fiber optic adapter 206 such that when the MTP fiber optic connector 204 is connected, the RFID IC chip 62(2) on the MTP fiber optic adapter 206 is electrically coupled to the RFID IC chip 62(1), 62(3) in the MTP fiber optic connector 204 according to the RFID circuit 60 of FIG. 2.

In order to provide the antenna wire 236 of the MTP fiber optic connector 204 in a different plane to an antenna embedded into the flexible electronic circuit 266 in the MTP fiber optic adapter 206, a platform 268 is provided in the outer adapter housing 250. The outer adapter housing 250 is designed to receive and hold the flexible electronic circuit 266 along the platform 268 provided in the outer adapter housing 250, which extends longitudinally from the front portion 258 to the rear portion 262 of the outer adapter housing 250. The platform 268 is comprised of two orthogonally or substantially orthogonally arranged housing portions 274(1), 274(2). The flexible electronic circuit 266 is comprised of similarly arranged orthogonally or substantially orthogonally arranged surfaces comprised of a bottom planar portion or surface 276(1) and two side planar portions or surfaces 276(2), 276(3) both connected orthogonally to the bottom portion 276(1).

To connect the flexible electronic circuit 266 to the MTP fiber optic adapter 206, the flexible electronic circuit 266 is inserted inside the outer adapter housing 250 against the inside of the platform 268. The flexible electronic circuit 266 is held between the inside of the platform 268 and the outside surface of the inner housing 254 when inserted inside the outer housing cavity 252 of the outer adapter housing 250. The flexible electronic circuit 266 contains an opening 278 that allows a flexible side latch 280 disposed in the inner housing 254 to insert into a latch holder 282 disposed in the outer adapter housing 250 as illustrated in FIG. 22.

Figure 23:
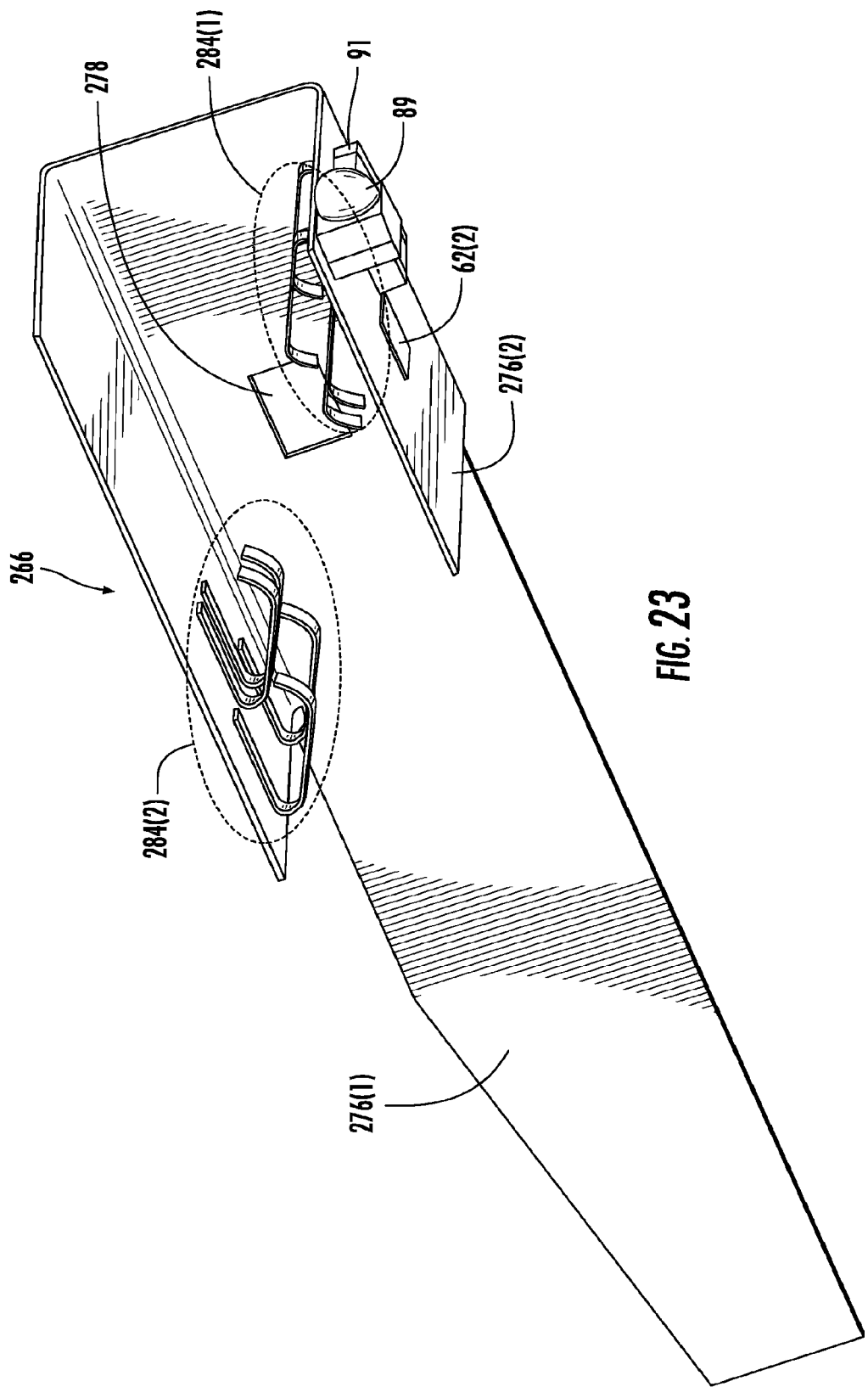
FIG. 23 is a side perspective view of an exemplary flexible electronic circuit with circuit layout according to FIG. 15 and configured to be inserted into the MTP fiber optic adapter in FIG. 17 to provide an RFID-equipped MTP fiber optic adapter.

As illustrated in FIGS. 22-23, the flexible electronic circuit 266 also contains adapter electrical contacts 284(1), 284(2) that protrude through the inner housing 254 when the flexible electronic circuit 266 is placed over the top of the inner housing 254. When the MTP fiber optic connector 204 is connected to the MTP fiber optic adapter 206, the electrical contacts 242 of the MTP fiber optic connector 204 contact one set of the adapter electrical contacts 284(1), 284(2) of the MTP fiber optic adapter 206 depending on into which side of the MTP fiber optic adapter 206 the MTP fiber optic connector 204 is plugged; either the front portion 258 or the rear end 262 of the outer adapter housing 250. This contact automatically establishes an electrical coupling between the RFID IC chip 62(1) or 62(3) in the PCB 234 of the MTP fiber optic connector 204 and the RFID IC chip 62(2) in the flexible electronic circuit 266 of the MTP fiber optic adapter 206 according to the RFID circuit 60 of FIG. 2, as previously described.

In this regard, FIG. 23 illustrates a side perspective view of the flexible electronic circuit 266 for the MTP fiber optic adapter 206 with the adapter electrical contacts 284(1), 284(2). Each set of adapter electrical contacts 284(1), 284(2) are coupled to the electrical contacts 242 of the PCB 234 of the MTP fiber optic connectors 204(1), 204(2) according to the electrical connection layout 180 in FIG. 15. The adapter electrical contacts 284(1), 284(2) are coupled via traces (not shown) in the flexible electronic circuit 266 to the RFID IC chip 62(2) mounted on the flexible electronic circuit 266 as shown in FIG. 23. The RFID IC chip 62(2) is coupled to the capacitor bank 91 and the light source 89 as previously described in the RFID circuit 60 of FIG. 2. This is further illustrated in the electrical contacts connection layout 180 of FIG. 15. Therein, the adapter electrical contacts 178(1), 178(2) are shown according to the connectivity of the RFID IC chip 62(2) and supporting circuitry in the RFID circuit 60 of FIG. 2.

Coupling the adapter electrical contacts 284(1), 284(2) to the electrical contacts 242 of the MTP fiber optic connectors 204(1), 204(1) connects the RFID IC chip 62(2) of the MTP fiber optic adapter 206 to the RFID IC chips 62(1), 62(3) of the MTP fiber optic connectors 204(1), 204(2). The first set of adapter electrical contacts 284(1) is for establishing electric contact with a first MTP fiber optic connector 204(1) connected to the MTP fiber optic adapter 206, as illustrated in FIG. 17. The coupling is established when the MTP fiber optic connector 204(1) is inserted into the front opening 256 of the MTP fiber optic adapter 206. In a similar regard, the second set of adapter electrical contacts 284(2) is for establishing electric contact with a second MTP fiber optic connector 204(2) connected to the MTP fiber optic adapter 206, as also illustrated in FIG. 17. This coupling is established when the MTP fiber optic connector 204(2) is inserted into the MTP fiber optic adapter 206. The second set of adapter electrical contacts 284(2) is placed on the flexible electronic circuit 266 on the side portion 276(3) instead of the same bottom portion 276(1) that contains the first set of adapter electrical contacts 284(1). This is because unlike the duplex LC fiber optic adapter 86, the MTP fiber optic adapter 206 requires the MTP fiber optic connectors 204(1), 204(2) to be connected to the MTP fiber optic adapter 206 in an opposing orientation to establish an optical connection between the two.

Figure 24:
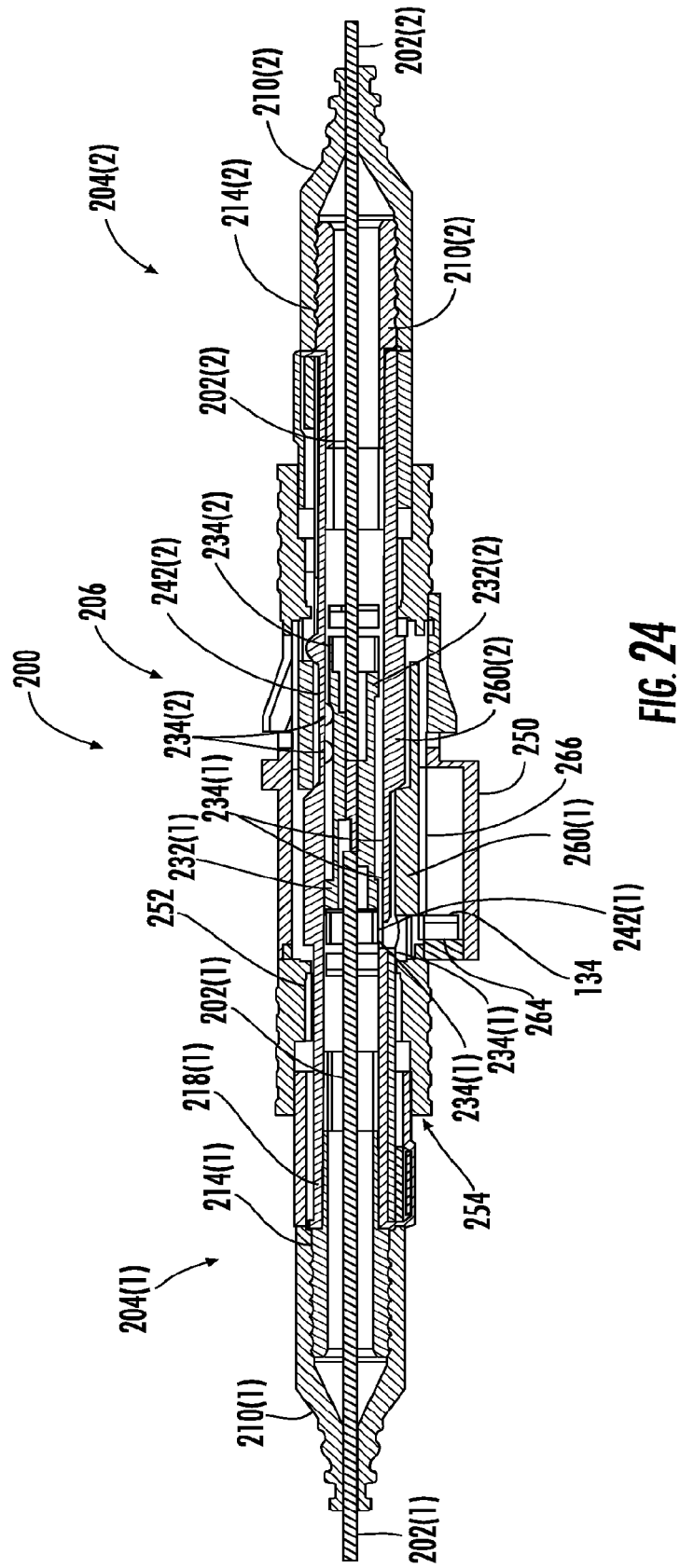
FIG. 24 is a cross-sectional view of the RFID-equipped MTP fiber optic connector connected to the RFID-equipped MTP fiber optic adapter in FIG. 17.

FIG. 24 is a cross-sectional view of the connection between the MTP fiber optic connectors 204(1), 204(2) and the MTP fiber optic adapter 206 when attached that shows the connection of the adapter electrical contacts 284(1), 284(2) from the flexible electronic circuit 266 contained in the MTP fiber optic adapter 206 to the circuit electrical contacts 242(1), 242(2) of PCBs 234(1), 234(2) for each MTP fiber optic connector 204(1), 204(2). In this manner, the RFID IC chips 62(1), 62(3) from the MTP fiber optic connectors 204(1), 204(2) are automatically coupled to the MTP fiber optic adapter 206 when the connections are established. The MTP fiber optic connectors 204(1), 204(2) and the MTP ferrules 232(1), 232(2) are inserted into the front opening 256 and into the outer housing cavity 252 of the MTP fiber optic adapter 206. The MTP ferrules 232(1), 232(2) are inserted into the ferrule supports 260(1), 260(2) to establish an optical connection. When the MTP ferrules 232(1), 232(2) are inserted fully into the ferrule supports 260(1), 260(2), the electrical contacts 242(1), 242(2) on the PCBs 234(1), 234(2) of the MTP fiber optic connectors 204(1), 204(2) couple to the adapter electrical contacts 284(1), 284(2), respectively, on the flexible electronic circuit 266 of the MTP fiber optic adapter 206.

As broadly embodied in FIGS. 3-24, examples of connectors, adapters, connector assemblies, cables, and mapping systems are disclosed, in which RFID technologies are employed, along with one or more condition responsive devices in certain embodiments of the present invention. The disclosed RFID technologies can be configured in different ways, resulting in different functionalities according to the invention. The RFID technologies can be disposed on any type of substrate, including any type of PCB or electronic circuit substrate, any of which may be rigid, semi-rigid, or flexible. In addition, complete RFID transponders and/or portions of RFID transponders may be located on a plug (such as a connector), a socket (such as an adapter), a housing, a separate object, or other components (or portions thereof). The condition responsive devices are responsive to one or more conditions and/or change in condition such as a state of contact, electrical contact closure, temperature, pressure, humidity, light, or capacitance (and/or impedance). The condition responsive device may be user-operated, for example, by pressing a activation button or connecting or disconnecting a plug from a socket, or the condition responsive device may be a passively operated sensor, or both could be employed together. Further, the condition and/or change in condition indicated by the condition responsive device may permit or preclude operation of a given RFID transponder. Alternatively, such condition and/or change in condition may simply be registered and/or reported by the RFID transponder without altering the operational status of the RFID transponder. It should also be understood that elements of the embodiments below may be mixed in different ways to achieve still further embodiments and functionality within the scope of the invention. Although the illustrated embodiments of the present invention are directed to passive RFID transponders, further embodiments include one or more active RFID transponders depending upon the particular functionality of the RFID transponder system desired.

Although the embodiments of the present invention described herein are directed to RFID systems used with communication components of telecommunications equipment, such as fiber optic connectors and adapters or copper connectors and adapters and other fiber optic and/or copper components, further embodiments of the present invention are used with non-telecommunications equipment, particularly regarding components that interconnect and/or are exposed to various conditions for which it is desirable to know the location, connectivity, and/or conditions of the components. The terms plug and socket are generally used herein to define portions of components that are adapted for connecting to one another, such as a connector that is received by an adapter, and are not necessarily limited to standard plugs and sockets.

Further, FIGS. 3-24 disclose examples of LC and MTP connection-type fiber optic connectors and adapters. However, the fiber optic components of further embodiments can include alternative types of fiber optic connectors such as MT, MJ, RJ, SC, etc., as well as connector fanout assemblies, housings for protectively sealing the connector-adapter interface, and the like. The embodiments disclosed herein are not limited to fiber optic components. Any type of communication components or mediums may be employed.

Many modifications and other embodiments of the invention set forth herein will come to mind to one skilled in the art to which the invention pertains having the benefit of the teachings presented in the foregoing descriptions and the associated drawings.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic component, comprising:
a housing supporting at least one fiber optic component to establish an optical connection;
at least one recessed area disposed within the housing defining a geometry; and
an electrical circuit disposed in the at least one recessed area such that the geometry of the housing is maintained, the electrical circuit disposed in a substrate disposed in the at least one recessed area,
wherein the substrate is further comprised of one or more electrical contacts coupled to the electrical circuit, and wherein the substrate is disposed in the at least one recessed area to expose the one or more electrical contacts on an outside of the housing, the one or more electrical contacts configured to establish an electrical contact with one or more electrical contacts provided in a compatible fiber optic component when connected.

2. The fiber optic component of claim 1, wherein the substrate is comprised from a group consisting of a printed circuit board (PCB) and a flexible electronic circuit.

3. The fiber optic component of claim 1, wherein the substrate has a complementary geometry to the geometry of the housing.

4. The fiber optic component of claim 1, wherein the substrate is comprised of a first side and a second side containing the one or more electrical contacts coupled to the electrical circuit, and wherein the first side of the substrate is disposed in the at least one recessed area to expose the one or more electrical contacts on the outside of the housing.

5. The fiber optic component of claim 1, wherein the housing is an inner housing and further comprises an outer housing placed over at least a portion of the inner housing to contain at least a portion of the substrate not containing the one or more electrical contacts in the at least one recessed area.

6. The fiber optic component of claim 1, wherein the housing is an inner housing and further comprises an outer housing placed over at least a portion of the inner housing to contain at least a portion of the electrical circuit in the at least one recessed area.

7. The fiber optic component of claim 1, further comprising an antenna coupled to the electrical circuit and extending through the housing.

8. The fiber optic component of claim 1, wherein the electrical circuit includes an RFID transponder configured to communicate data concerning the at least one fiber optic component to an RFID reader.

9. The fiber optic component of claim 8, further comprising an activation switch disposed in the electrical circuit and coupled to the RFID transponder, wherein the RFID transponder is configured to be activated to allow communication of the data concerning the at least one fiber optic component in response to activation of the activation switch.

10. The fiber optic component of claim 8, wherein the data concerning the at least one fiber optic component includes information comprised from a group consisting of identity of the at least one fiber optic component, status of a connection to the at least one fiber optic component, manufacturing information, diagnostic information, and event history information.

11. A system for identifying a connection of at least two fiber optic components, comprising:
a fiber optic connector comprising a first transponder and coupled to a first antenna located in a first plane; and
a fiber optic adapter connected to the fiber optic connector, wherein the fiber optic adapter comprises a second transponder coupled to a second antenna located in a second plane non-parallel to the first plane,
wherein the first transponder is disposed in a first substrate containing a first one or more electrical contacts coupled to a first electrical circuit,
wherein the second transponder is disposed in a second substrate containing a second one or more electrical contacts coupled to a second electrical circuit,
the second one or more electrical contacts configured to establish an electrical contact with the first one or more electrical contacts to establish an electrical connection between the first electrical circuit and the second electrical circuit when the fiber optic connector is connected to the fiber optic adapter.

12. The system of claim 11, wherein the second transponder is configured to be activated when the second one or more electrical contacts are coupled to the first one or more electrical contacts.

13. The system of claim 12, wherein the first transponder and the second transponder are configured to communicate with each other via signals between the first one or more electrical contacts and the second or more electrical contacts when the fiber optic connector is connected to the fiber optic adapter.

14. The system of claim 11, wherein the first transponder is disposed in at least one recessed area of the fiber optic connector such that a geometry of the fiber optic connector is maintained, and the second transponder is disposed in at least one recessed area of the fiber optic adapter such that a geometry of the fiber optic adapter is maintained.

15. The system of claim 11, further comprising:
the first antenna coupled to the first transponder and extending through a housing of the fiber optic connector; and
the second antenna coupled to the second transponder and extending through a housing of the fiber optic adapter.

16. The system of claim 11, wherein the first transponder is configured to communicate data concerning the fiber optic connector to a RFID reader, and the second transponder is configured to communicate data concerning the fiber optic adapter to a RFID reader.

17. The fiber optic component of claim 16, wherein the data concerning the fiber optic connector includes information comprised from a group consisting of identity of the fiber optic connector, status of a connection to the fiber optic connector, manufacturing information, diagnostic information, and event history information; and the data concerning the fiber optic adapter includes information comprised from a group consisting of identity of the fiber optic adapter, status of a connection to the fiber optic adapter, manufacturing information, diagnostic information, and event history information.

18. A system for identifying a connection of at least two fiber optic components, comprising:
- a fiber optic connector comprising a first transponder and coupled to a first antenna located in a first plane, the first transponder is disposed in a first substrate containing a first one or more electrical contacts coupled to a first electrical circuit; and
- a fiber optic adapter connected to the fiber optic connector, the fiber optic adapter comprises a second transponder coupled to a second antenna located in a second plane non-parallel to the first plane, the second transponder is disposed in a second substrate containing a second one or more electrical contacts coupled to a second electrical circuit,
wherein the second transponder is configured to be activated when the second one or more electrical contacts abut against the first one or more electrical contacts.

* * * * *